US009407483B2

(12) United States Patent
Abbasfar et al.

(10) Patent No.: US 9,407,483 B2
(45) Date of Patent: Aug. 2, 2016

(54) COMMUNICATION USING CONTINUOUS-PHASE MODULATED SIGNALS

(71) Applicant: Lattice Semiconductor Corporation, Portland, OR (US)

(72) Inventors: Aliazam Abbasfar, Mountain View, CA (US); Farshid Aryanfar, Allen, TX (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/689,908

(22) Filed: Apr. 17, 2015

(65) Prior Publication Data

US 2015/0222465 A1 Aug. 6, 2015

Related U.S. Application Data

(63) Continuation of application No. 14/101,274, filed on Dec. 9, 2013, now Pat. No. 9,031,164, which is a continuation of application No. 12/679,764, filed as application No. PCT/US2008/061846 on Apr. 29, 2008, now Pat. No. 8,605,823.

(Continued)

(51) Int. Cl.
*H03F 3/18* (2006.01)
*H04L 27/22* (2006.01)
(Continued)

(52) U.S. Cl.
CPC  *H04L 27/22* (2013.01); *H04B 1/16* (2013.01); *H04L 27/2014* (2013.01); *H04L 27/2082* (2013.01)

(58) Field of Classification Search
CPC . H04L 27/2014; H04L 27/22; H04L 27/2082; H04B 1/16

USPC .................. 375/305–306, 329, 295, 315–316
See application file for complete search history.

(56) References Cited

U.S. PATENT DOCUMENTS 4,475,220 A * 10/1984 Mattei .................. H04L 7/0054
327/7
4,500,856 A *  2/1985 Childs ................. H04L 27/2014
332/101
(Continued)

FOREIGN PATENT DOCUMENTS

EP           1924041  A1    5/2008
WO    WO 2007/029 727  A1    3/2007

OTHER PUBLICATIONS

Xiong, Fuqin ; Pinchak, S. ; Kue Chun; Sliding window symbol timing synchronizer, IEEE; Digital Avionics Systems Conference, 2002. Proceedings. The 21st vol. 1, 2002.

(Continued)

*Primary Examiner* — Qutbuddin Ghulamali
(74) *Attorney, Agent, or Firm* — Fenwick & West LLP

(57) ABSTRACT

Embodiments of a circuit are described. In this circuit, a modulation circuit provides a first modulated electrical signal and a second modulated electrical signal, where a given modulated electrical signal, which can be either the first modulated electrical signal or the second modulated electrical signal, includes minimum-shift keying (MSK) modulated data. Moreover, a first phase-adjustment element, which is coupled to the modulation circuit, sets a relative phase between the first modulated electrical signal and the second modulated electrical signal based on a phase value of the first phase-adjustment element. Additionally, an output interface, which is coupled to the first phase-adjustment element, is coupled to one or more antenna elements which output signals. These signals include a quadrature phase-shift-keying (QPSK) signal corresponding to the first modulated electrical signal and the second modulated electrical signal.

21 Claims, 19 Drawing Sheets

Related U.S. Application Data

(60) Provisional application No. 60/955,757, filed on Aug. 14, 2007, provisional application No. 60/971,945, filed on Sep. 13, 2007.

(51) Int. Cl.
*H04L 27/20* (2006.01)
*H04B 1/16* (2006.01)

(56) References Cited

U.S. PATENT DOCUMENTS

| | | | | |
|---|---|---|---|---|
| 4,773,083 A * | 9/1988 | Baumbach | ............... | H04L 1/205 327/552 |
| 5,068,668 A * | 11/1991 | Tsuda | ................... | H01Q 21/245 333/21 A |
| 5,483,555 A * | 1/1996 | Hattori | ................... | H03D 3/006 329/360 |
| 6,411,824 B1 | 6/2002 | Eidson | | |
| 6,470,055 B1 | 10/2002 | Feher | | |
| 6,873,218 B2 * | 3/2005 | Khlat | ................... | H03C 3/0925 332/103 |
| 8,311,146 B2 * | 11/2012 | Fujimura | ............ | H04L 27/2014 375/260 |
| 2004/0049717 A1 * | 3/2004 | Ahn | ..................... | H04B 1/7087 714/699 |
| 2004/0081229 A1 * | 4/2004 | Narayan | ............. | H04J 13/0048 375/147 |
| 2007/0160168 A1 | 7/2007 | Beukema et al. | | |
| 2008/0253308 A1 | 10/2008 | Ward et al. | | |
| 2011/0020013 A1 | 1/2011 | Griffin | | |

OTHER PUBLICATIONS

Bucket, K. ; Moeneclaey, M; Symbol synchronizer performance affected by non-ideal interpolation in digital modems; IEEE; Communications, 1994. ICC '94, Supercomm/ICC '94, Conference.

Cavers, J.K., "Space-Time Coding Using MSK," IEEE Transactions on Wireless Communications, IEEE Service Center, Piscataway, NJ vol. 4, No. 1, Jan. 2005, pp. 185-191, ISSN: 1436-1276. 7 pages.

Molisch et al., "Space-Time-Frequency (STF) Coding for MIMO-ODFM Systems," IEEE Communications Letters, vol. 6, No. 9, Sep. 2002. 3 pages.

PCT International Preliminary Report on Patentability dated Feb. 25, 2010 (Chapter I) re Int'l Appln. No. PCT/US2008/061846. 10 pages.

United States Office Action, U.S. Appl. No. 14/101,274, Sep. 11, 2014, 7 pages.

United States Office Action, U.S. Appl. No. 12/679,764, Apr. 27, 2012, 5 pages.

United States Office Action, U.S. Appl. No. 12/679,764, Nov. 21, 2011, 17 pages.

* cited by examiner

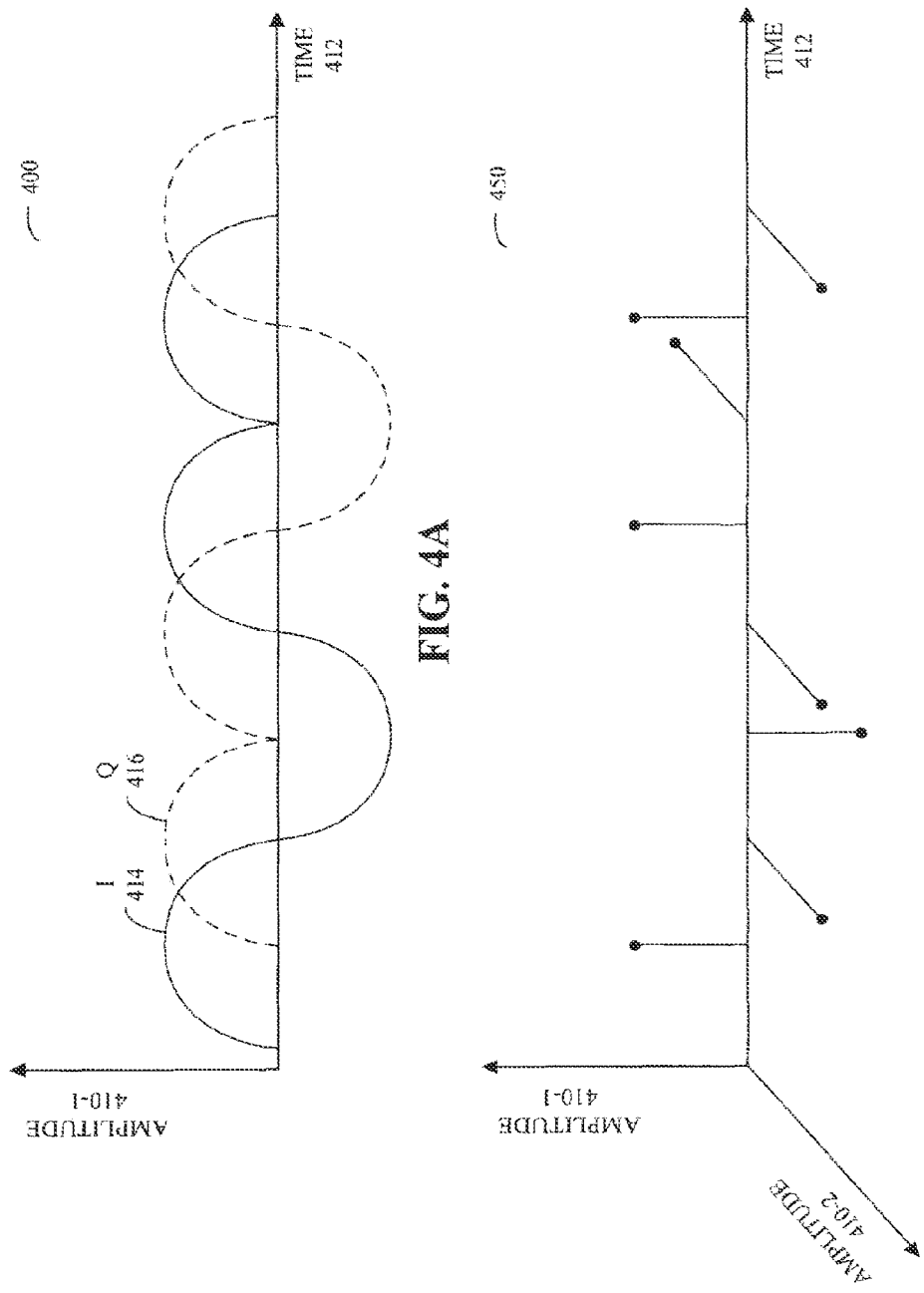

```
                                                                    ┌─ 700
┌─────────────────────────────────────────────────────────────────┐
│  RECEIVE A FIRST ELECTRICAL SIGNAL USING A FIRST ANTENNA ELEMENT │
│  AND A SECOND ELECTRICAL SIGNAL USING A SECOND ANTENNA ELEMENT,  │
│  WHERE A GIVEN ELECTRICAL SIGNAL IN THE FIRST ELECTRICAL SIGNAL AND │
│   THE SECOND ELECTRICAL SIGNAL INCLUDES A QUADRATURE PHASE-SHIFT │
│                       KEYING (QPSK) SIGNAL                       │
│                               710                                │
└─────────────────────────────────────────────────────────────────┘
                                  │
                                  ▼
┌─────────────────────────────────────────────────────────────────┐
│   SET A RELATIVE PHASE BETWEEN THE FIRST ELECTRICAL SIGNAL AND THE │
│                     SECOND ELECTRICAL SIGNAL                     │
│                               712                                │
└─────────────────────────────────────────────────────────────────┘
```

FIG. 7

COMMUNICATION USING CONTINUOUS-PHASE MODULATED SIGNALS

CROSS REFERENCE TO RELATED APPLICATIONS

This application is a continuation of U.S. patent application Ser. No. 14/101,274 entitled "Communication Using Continuous-Phase Modulated Signals," filed Dec. 9, 2013, which is a continuation of U.S. patent application Ser. No. 12/679,764, entitled "Communication Using Continuous-Phase Modulated Signals," filed Mar. 24, 2010, now U.S. Pat. No. 8,605,823; which is a national stage entry of International Patent Application PCT/US2008/061846, entitled "Communication Using Continuous-Phase Modulated Signals," and filed Apr. 29, 2008; which claims priority to U.S. patent application Ser. No. 60/955,757 entitled "Multi-Path Signal Reduction Using Adaptive Antenna Polarization," and filed Aug. 14, 2007 and U.S. patent application Ser. No. 60/971,945 entitled "Communication Using Continuous-Phase Modulated Signals," and filed Sep. 13, 2007. Each of the foregoing is incorporated by reference herein in their entirety.

FIELD OF THE INVENTION

The present embodiments relate to techniques for communicating information. More specifically, the present embodiments relate to circuits and methods for communicating information using continuous-phase-modulated signals and/or adjusting polarizations for transmit and/or receive antennas to reduce multi-path signals.

BRIEF DESCRIPTION OF THE FIGURES

FIG. 4A is a graph illustrating an embodiment of components of a minimum shift-keying signal.

FIG. 4B is a graph illustrating an embodiment of a minimum shift-keying signal.

FIG. 7 is a flow chart illustrating an embodiment of a process for receiving signals.

Note that like reference numerals refer to corresponding parts throughout the drawings.

DETAILED DESCRIPTION

Figure 1A:
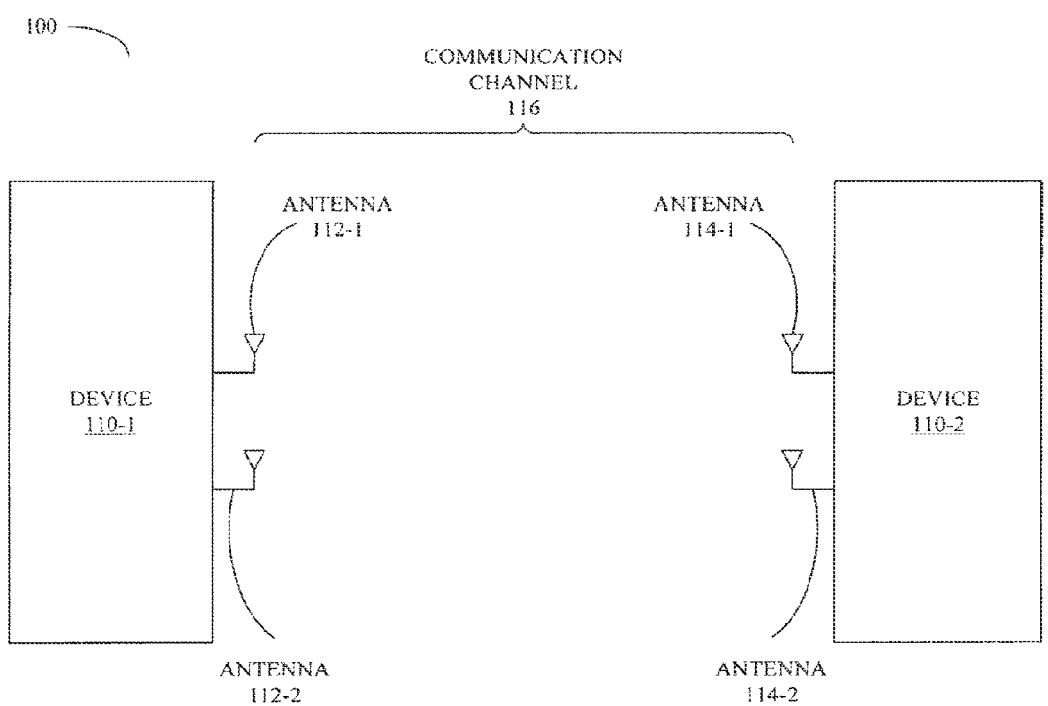
FIG. 1A is a block diagram illustrating an embodiment of a communication system.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

Embodiments of a circuit, an integrated circuit that includes the circuit, and techniques for communicating signals between devices in a communication system are described. In this circuit, a modulation circuit provides a first modulated electrical signal and a second modulated electrical signal, where a given modulated electrical signal, which can be either the first modulated electrical signal or the second modulated electrical signal, includes minimum-shift keying (MSK) modulated data. Moreover, a first phase-adjustment element, which is coupled to the modulation circuit, sets a relative phase between the first modulated electrical signal and the second modulated electrical signal based on a phase value of the first phase-adjustment element. Additionally, an output interface, which is coupled to the first phase-adjustment element, is coupled to one or more antenna elements which output signals. These signals include a quadrature phase-shift-keying (QPSK) signal corresponding to the first modulated electrical signal and the second modulated electrical signal.

In some embodiments, the phase value is approximately 90°. Moreover, in some embodiments the phase value is adjustable.

In some embodiments, the circuit includes one or more amplifiers coupled to the modulation circuit. These amplifiers may separately amplify the first modulated electrical signal and the second modulated electrical signal prior to the phase-adjustment element setting the relative phase.

In some embodiments, the circuit includes a first antenna coupled to the output interface. This first antenna includes a first antenna element and a second antenna element, where the first antenna element may be associated with a first polarization and the second antenna element may be associated with a second polarization. In one embodiment, the first polarization and the second polarization are substantially orthogonal. In some embodiments the circuit additionally includes a second antenna coupled to the output interface and a third antenna coupled to the output interface, where the second antenna includes the first antenna element and the third antenna includes the second antenna element.

In some embodiments, the phase value is determined based on feedback received from another circuit that includes a receiver that receives the QPSK signal. In particular, the feedback may be based on a relative phase of the signals at the other circuit. Moreover, in some embodiments the circuit includes control logic to determine the phase value based on the feedback.

In some embodiments, the modulation circuit receives a first data stream and a second data stream, where the first modulated electrical signal corresponds to the first data stream and the second modulated electrical signal corresponds to the second data stream. Moreover, the circuit may include a decimator circuit, which receives an initial data stream and outputs the first data stream and the second data stream. Note that the first data stream may include even data bits in the initial data stream, and the second data stream may include odd data bits in the initial data stream.

In some embodiments, the circuit includes a first combiner circuit coupled to the first phase-adjustment element and the output interface. This combiner circuit receives the first modulated electrical signal and the second modulated electrical signal and outputs a first combined electrical signal and a second combined electrical signal. Moreover, the first combined electrical signal may include a sum of the first modulated electrical signal and the second modulated electrical signal and the second combined electrical signal may include a difference of the first modulated electrical signal and the second modulated electrical signal.

In some embodiments, the circuit includes at least a second phase-adjustment element coupled to the first combiner circuit and the output interface. This phase-adjustment element sets a relative phase between the first combined electrical signal and the second combined electrical signal based on a phase value of the second phase-adjustment element. Note that the phase value of the second phase-adjustment element may be based on feedback received from the other circuit that receives the signals. For example, the feedback may be based on a relative phase of the signals at the other circuit. In some embodiments, the control logic determines the phase value of the second phase-adjustment element based on the feedback.

Another embodiment provides the other circuit and another integrated circuit that includes the other circuit. In this other circuit, an input interface, which is coupled to a third antenna element and a fourth antenna element, receives a first electrical signal from the third antenna element and a second electrical signal from the fourth antenna element. Note that a given electrical signal, which can be either the first electrical signal or the second electrical signal, includes a QPSK signal. Moreover, a third phase-adjustment element, which is coupled to the input interface, sets a relative phase between the first electrical signal and the second electrical signal based on a phase value of the third phase-adjustment element.

In some embodiments, the other circuit includes additional control logic to determine a phase relationship between the first electrical signal and the second electrical signal and to determine the phase value based on the phase relationship. Moreover, the other circuit provides feedback about another phase value (such as the phase value of the first phase-adjustment element or the second phase-adjustment element) to the circuit, which transmits signals corresponding to the first electrical signal and the second electrical signal to the other circuit.

In some embodiments, the other circuit includes a fourth antenna coupled to the input interface. This antenna includes the third antenna element and the fourth antenna element. However, in some embodiments the other circuit includes a fifth antenna coupled to the input interface and a sixth antenna coupled to the input interface, wherein the fifth antenna includes the third antenna element and the sixth antenna includes the fourth antenna element.

In some embodiments, the third antenna element is associated with a third polarization and the fourth antenna element is associated with a fourth polarization. Moreover, the third polarization and the fourth polarization may be substantially orthogonal.

In some embodiments, the other circuit includes a second combiner circuit coupled to the input interface and the third phase-adjustment element. This combiner circuit receives the first electrical signal and a second electrical signal and outputs a third combined electrical signal and a fourth combined electrical signal. Moreover, in some embodiments the third combined electrical signal includes a sum of the first electrical signal and a second electrical signal and the fourth combined electrical signal includes a difference of the first electrical signal and the second electrical signal.

Another embodiment provides a system that includes a device and another device. This device includes the circuit and the other device includes the other circuit. Moreover, the other device receives the signals and provides feedback to the device. Note that the feedback may be based on a metric associated with the received signals.

Another embodiment provides a method for transmitting signals, which may be performed by the device. During operation, the device generates the first modulated electrical signal and the second modulated electrical signal, where a given modulated electrical signal in the first modulated electrical signal and the second modulated electrical signal includes MSK modulated data. Next, the device sets a relative phase between the first modulated electrical signal and the second modulated electrical signal. Then, the device transmits the signals using one or more antenna elements, where the signals include a QPSK signal corresponding to the first modulated electrical signal and the second modulated electrical signal.

Another embodiment provides a method for receiving signals, which may be performed by the other device. During operation, the other device receives the first electrical signal using the third antenna element and the second electrical signal using the fourth antenna element, where a given electrical signal in the first electrical signal and the second electrical signal includes a QPSK signal. Next, the other device sets a relative phase between the first electrical signal and the second electrical signal.

Additional embodiments of a circuit, an integrated circuit that includes the circuit, and a technique for communicating between devices in a communication system are also described. In this circuit, a first input node receives a first electrical signal and a second input node receives a second electrical signal, where the first electrical signal is associated with a first polarization of signals received by the circuit and the second electrical signal is associated with a second polarization of the signals received by the circuit. Control logic in the circuit determines one or more multi-path signals in the at least one of the first electrical signal and the second electrical signal and determines a phase value to reduce a contribution of the one or more multi-path signals to a combination of the first electrical signal and the second electrical signal. Moreover, the circuit includes a phase-adjustment element coupled to at least one of the first input node and the second input node, where the phase-adjustment element sets a relative phase between the first electrical signal and the second electrical signal based on the phase value of the phase-adjustment element.

In some embodiments, the first polarization and the second polarization are substantially orthogonal. Moreover, the received signals may be elliptically polarized.

In some embodiments, the circuit includes an antenna including a first element and a second element, where the first element is coupled to the first input node and the second element is coupled to the second input node. Note that the first element may be associated with the first polarization and the second element may be associated with the second polarization.

However, in some embodiments the circuit includes a first antenna coupled to the first input node and a second antenna coupled to the second input node, where the first antenna is associated with the first polarization and the second antenna is associated with the second polarization.

In some embodiments, the one or more multi-path signals are associated with a range of times during which the signals are received.

In some embodiments, the control logic determines the phase value to increase a power associated with the first electrical signal and/or the second electrical signal.

In some embodiments, the circuit includes an amplifier coupled between the phase-adjustment element and the first input node and the second input node.

In some embodiments, the circuit includes a combiner coupled to the phase adjustment element, and a detection circuit coupled to the combiner. Note that the combiner may combine the first electrical signal and the second electrical signal.

In some embodiments, the phase-adjustment element adjusts an amplitude of at least one of the first electrical signal and the second electrical signal.

In some embodiments, the phase value is between −90° and 90°. For example, the phase value may be quantized using 15° increments.

In some embodiments, the phase value is set during a calibration mode.

In some embodiments, the circuit provides feedback about another phase value to another circuit which transmits the signals to the circuit. For example, the feedback may be provided via a data communication channel between the circuit and the other circuit. Moreover, the feedback may be provided using in-band and/or out-of-band communication. However, in some embodiments the feedback is provided via a communication channel which is separate from the data communication channel.

Another embodiment provides the other circuit and another integrated circuit that includes the other circuit. This other circuit includes another phase-adjustment element which sets a relative phase between a third electrical signal and a fourth electrical signal based on the other phase value of the other phase-adjustment element. Moreover, the other circuit includes an output interface coupled to the other phase-adjustment element, where the output interface includes a third input node to receive the third electrical signal and a fourth input node to receive the fourth electrical signal, and where the third input node is associated with a third polarization of signals transmitted by the other circuit and the fourth input node is associated with a fourth polarization of the signals transmitted by the other circuit. Note that the other phase value maybe determined based on the feedback received from the circuit that receives the signals, and that the feedback may be based on the contribution of one or more multi-path signals to the signals.

Another embodiment provides a system that includes a device and another device. This device includes the circuit and the other device includes the other circuit. Moreover, the other device receives the signals and provides feedback to the device. Note that the feedback may be based on a metric associated with the received signals.

Another embodiment provides a method for setting a relative phase, which may be performed by the device. During operation, the device receives the first electrical signal associated with the first polarization of signals transmitted by the other device and receives the second electrical signal associated with the second polarization of the signals. Next, the device determines one or more multi-path signals in the at least one of the first electrical signal and the second electrical signal. Then, the device calculates the relative phase between the first electrical signal and the second electrical signal to reduce a contribution of one or more multi-path signals to a combination of the first electrical signal and the second electrical signal. Moreover, the device sets the relative phase.

Another embodiment provides a method for setting another relative phase, which may be performed by the other device. During operation, the other device transmits signals to the device, where in the signals include the third electrical signal associated with a third polarization of the signals and a fourth electrical signal associated with a fourth polarization of the signals. Next, the other device receives the feedback from the device based on the metric associated with the signals, including a contribution of one or more multipath signals to the signals. Then, the other device sets the other relative phase between the third electrical signal and the fourth electrical signal based on the feedback.

The aforementioned embodiments may be used in a wide variety of applications, including: serial or parallel wireless links, wireless metropolitan area networks (such as WiMax), wireless local area networks (WLANs), wireless personal area networks (WPANs), and systems and devices that include one or more antennas. For example, the embodiments may be used in conjunction with ultra-wide-band (UWB) communication and/or a communication standard associated with the Multi-Band OFDM Alliance (MBOA). Furthermore, the aforementioned embodiments may be used in: desktop or laptop computers, hand-held or portable devices (such as personal digital assistants and/or cellular telephones), set-top boxes, home networks, and/or video-game devices.

We now describe embodiments of circuits, wireless communication devices and systems that include these circuits or devices, and communication technique for use in the devices and systems. FIG. 1A presents a block diagram illustrating an embodiment of a communication system 100. In this system, device 110-1 communicates information with device 110-2 via a communication channel 116 using wireless communication. Note that communication between the devices 110 may be simultaneous (i.e., full duplex communication in which both devices 110 may transmit and receive information at the same time) or the communication direction may alternate (i.e., half-duplex communication in which, at a given time, one device transmits information and the other device receives information).

Device 110-1 may include or may be coupled to antenna circuitry, such as antennas 112, to generate and/or receive signals and device 110-2 may include or may be coupled to antenna circuitry, such as antennas 114, to generate and/or receive signals. In an exemplary embodiment, the antennas 112 and 114 include micro-stripline elements and are configured to output and/or receive signals in a 7 GHz frequency band centered on 60 GHz (or on a frequency between 50 and 90 GHz). Furthermore, in some embodiments the antennas 112 are included in a phased-array antenna and the antennas 114 are included in another phased-array antenna. These phased-array antennas may transmit and receive shaped beams. For example, the shaped beams may have a beam width of 15-25°.

Note that antennas 112 and 114 may facilitate communication of information between the devices 110 using signals modulated onto high carrier frequencies (such as 60 GHz), or in communication systems in which the transmission power is restricted (such as less than 10 mW) in which the communication may be over distances on the order of 10 m. In particular, signals transmitted by one of the devices 110 may reflect off of objects in proximity to the devices 110. Thus, communication between the devices 110 may occur via direct (line-of-sight) or indirect (also referred to as multi-path or non-line-of-sight) communication paths (which may include line-of-sight or near line-of-sight communication). Note that multi-path communication (and multi-path signals) may be associated with scattering off of objects.

During the communication between the devices 110 using a communication path in the communication channel 116, device 110-2 may provide feedback to device 110-1 by characterizing the performance (which is also referred to as signal condition) of the communication path. For example, the characterization may include determining or measuring: a signal strength (such as a signal amplitude or a signal intensity), a mean square error (MSE) relative to a target (such as a threshold, a point in a constellation diagram, and/or a sequence of points in a constellation diagram), a signal-to-noise ratio (SNR), a bit-error rate (BER), a timing margin, and/or a voltage margin. In some embodiments, the characterization of the communication path is performed continuously, after a time interval has elapsed since a previous characterization of the communication path, and/or as needed.

Note that the communication of data, feedback information and/or control information (described below) may use in-band or out-of-band signaling (relative to the range of frequencies and/or bands of frequencies used in the communication path). Furthermore, in some embodiments communication of feedback information and/or control information between the devices 110 may occur via a separate link, such as a wireless link that has a lower data rate than the data rate of the communication paths and/or using a different carrier frequency or modulation technique than the carrier frequency of the signals on the communication path. For example, this link may include a wireless LAN (such as IEEE 802.11 or Bluetooth®).

In some embodiments, the communication path includes multiple subchannels. Signals carried on these sub-channels may be time-multiplexed, frequency multiplexed, and/or encoded. Thus, in some embodiments the communication channel 116 uses time-division multiple access (TD1VfA), frequency-division multiple access (FD1VfA) and/or code-division multiple access (CDA1A).

In some embodiments, signals on the communication path use discrete multitone communication (such as orthogonal frequency-division multiplexing or OFDM), which include multiple sub-channels. A range of frequencies, a frequency band, or groups of frequency bands may be associated with a given sub-channel (henceforth referred to as a frequency band). Frequency bands for adjacent sub-channels may partially or completely overlap, or may not overlap. For example, there may be part1A1 overlap of neighboring frequency bands, which occurs in so-called approximate bit loading. Furthermore, signals on adjacent sub-channels may be orthogonal.

Furthermore, in some embodiments a variety of techniques are used to restore or recover the communication path if there is a loss of signal condition. For example, signals on the communication path may be static or may be dynamically configured. Thus, one or more of the sub-channels in the communication path may be adjusted when there is a loss or degradation of signal condition. For example, the number of sub-channels may be changed, or the data rate may be modified.

In some embodiments, an auto-negotiation technique is used between the devices 110 in an attempt to restore or recover the communication path. During this auto-negotiation technique, device 110-2 may provide feedback to device 110-1 on the efficacy of any changes to the signals on communication path (henceforth referred to as remedial action). Device 110-1 may further modify these signals and may try to re-establish or maintain communication on communication path. Note that the remedial action may include: retransmitting previous data; transmitting previous or new data (henceforth referred to as data) using an increased transmission power than the transmission power used in a previous transmission; reducing the data rate relative to the data rate used in a previous transmission; transmitting data with reduced intersymbol interference (for example, with blank intervals inserted before and/or after the data); transmitting data at a single clock edge (as opposed to dual-data-rate transmission); transmitting data with at least a portion of the data including an error-correction code (ECC) or an error-detection code (EDC); transmitting data using a different encoding or modulation code than the encoding used in a previous transmission; transmitting data after a pre-determined idle time; transmitting data to a different receiver in device 110-2; and/or transmitting data to another device (which may attempt to forward the data to device 110-2).

In some embodiments, communication between the devices 110 occurs using multiple communication paths. For example, one or both of the devices 110 may select a primary communication path based on the signal condition. If this primary communication path is subsequently degraded or disrupted, an alternate communication path may be used (i.e., the devices 110 may switch to the alternate communication path). This alternate communication path may be pre-determined by the devices 110 or may be identified by one or both of the devices 110 if the primary communication path is degraded or disrupted. Note that the use of an alternate communication path may supplement or may be used independently of the previously described remedial action.

Note that communication system 100 may include fewer components or additional components. For example, there may be fewer or more antennas 112 and/or 114. Moreover, in some embodiments one or more of the devices 110 selects the communication path, at least in part, based on information associated with a positioning system (such as a local, differential, and/or global positioning system). This technique may allow the devices 110 to adapt when there is relative motion of the devices 110. Thus, device 110-1 may adapt one or more shaped beams based on information about the relative motion. Alternatively, the information associated with the positioning system may alert device 110-1 to the presence of another proximate device (such as the device 110-2).

Figure 1B:
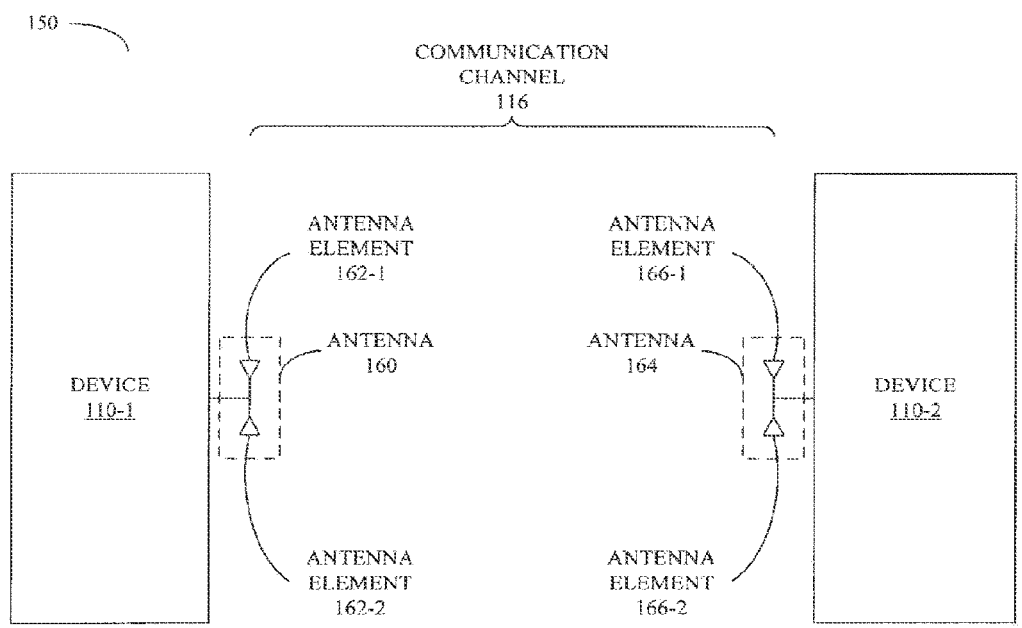
FIG. 1B is a block diagram illustrating an embodiment of a communication system.

Furthermore, two or more components may be combined into a single component, and the position of one or more components may be changed. For example, antennas 112 may be combined in a single antenna and/or antennas 114 may be combined in a single antenna. This is shown in FIG. 1B, which presents a block diagram illustrating an embodiment of a communication system 150. In this system, device 110-1 may include or maybe coupled to antenna circuitry, such as antenna 160 (which includes antenna elements 162), to generate and/or receive signals and device 110-2 may include or may be coupled to antenna circuitry, such as antennas 164 (which includes antenna elements 166), to generate and/or receive signals.

Figure 2A:
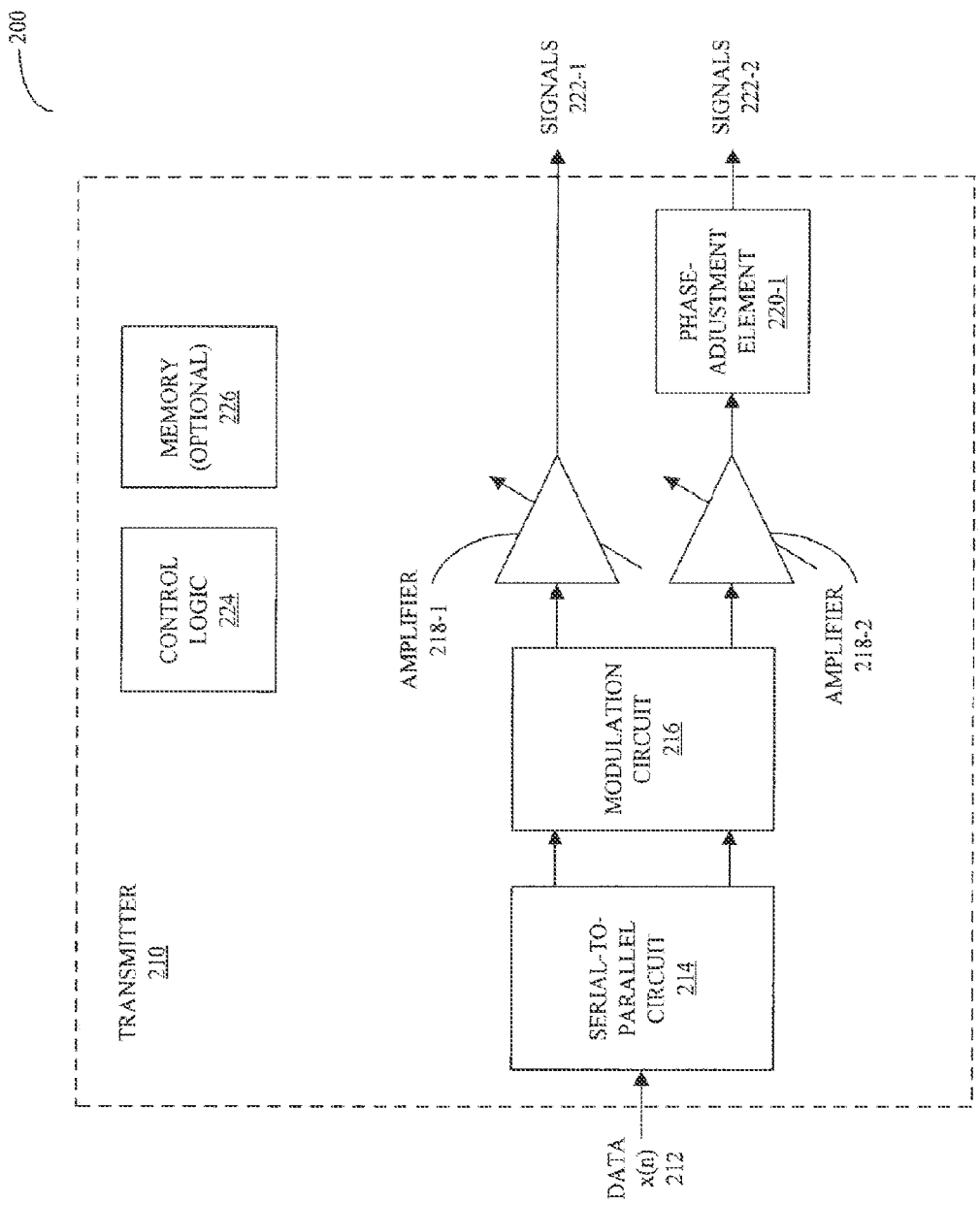
FIG. 2A is a block diagram illustrating an embodiment of a transmitter communication circuit.

We now describe communication circuits that may be used in either of the devices 110. FIG. 2A presents a block diagram illustrating an embodiment 200 of a transmitter 210 communication circuit, which may be used in devices 110 (FIGS. 1A and 1B). This transmitter may be used to: receive data x(n) 212; to generate two independent modulated signals; to set a phase value (which may be adjustable) representing the relative phase difference between the modulated electrical signals to be transmitted; and to transmit these electrical signals. Note that while the data x(n) 212 is modulated in the transmitter 210, in some embodiments the data x(n) 212 is also at least partially encoded or modulated prior to the transmitter 210.

After transmitter 210 receives data x(n) 212, serial-to-parallel circuit 214 may separate a first data stream (such as even bits) and a second data stream (such as odd data bits) in the data x(n) 212. These data streams may be provided to one or more modulators, such as modulation circuit 216. Modulation circuit 216 may independently modulate these data streams to generate a first modulated electrical signal (which corresponds to the first data stream) and a second modulated electrical signal (which corresponds to the second data stream). Moreover, in some embodiments control logic 224 may encode or modulate the data x(n) 212 based on look-up tables stored in optional memory 226 and/or using dedicated circuits (such as modulation circuit 216).

Note that encoding should be understood to include modulation coding and/or spread-spectrum encoding, for example, coding based on binary pseudorandom sequences (such as maximal length sequences or m-sequences), Gold codes, and/or Kasami sequences.

In some embodiments, at least a portion of the data x(n) 212 includes error-detection-code (EDC) information and/or error-correction-code (ECC) information. For example, pre-existing ECC information may be incorporated into at least a portion of the data x(n) 212 (such as in one or more data packets). Alternatively, ECC information may be dynamically generated (i.e., in real time) based on at least a portion of the data x(n) 212, and this ECC information may then be included with signals 222 transmitted by transmitter 210.

In some embodiments, the ECC includes a Bose-Chaudhuri-Hochquenghem (BCH) code. Note that BCH codes are a sub-class of cyclic codes. In exemplary embodiments, the ECC includes: a cyclic redundancy code (CRC), a parity code, a Hamming code, a Reed-Solomon code, and/or another error checking and correction code.

In an exemplary embodiment, the two data streams are modulated using a type of continuous phase modulation (CPM), which offer a constrained power spectral density (i.e., are bandwidth efficient with a constrained power spectrum) and have a constant envelope. Note that CPM has a constant phase envelope with no discontinuous phase jumps.

For example, the two data streams may be independently modulated using MSK. As discussed further below, MSK has a linear representation which allows linear equalization to be used. This capability may be useful for communication channels, such as communication channel 116 (FIGS. 1A and 1B), which are dispersive. Moreover, by appropriately combining the two modulated electrical signals a spectral efficiency greater than 1 bit/Hz (such as 2 bits/Hz) may be achieved.

In particular, after modulation one or more power amplifiers, such as amplifiers 218, may separately amplify the modulated electrical signals. In some embodiments, either or both amplifiers 218 have variable or adjustable gain. Before, during or after this amplification, the modulated electrical signals may be converted to analog electrical signals using a digital-to-analog converter (DAC) and RF up-converted to one or more appropr1Ate frequency bands using one or more carrier frequencies $f_i$ associated with one or more sub-channels. For example, the up-conversion may use frequency-conversion elements, such as one or more heterodyne mixers or modulators.

Then, phase-adjustment element 220-1 sets a relative phase between the first modulated electrical signal and the second modulated electrical signal based on a first phase value of the phase-adjustment element 220-1. In exemplary embodiment, the relative phase is 90°. However, in some embodiments the first phase value may be adjustable. This capability may be useful in the presence of distortion (such as antenna mismatch or cross-polarization distortion) and/or multi-path signals in a communication channel, such as the communication channel 116 (FIGS. 1A and 1B). In general, the first phase value set by phase-adjustment element 220-1 may take on an arbitrary value (consequently, as discussed below, signals 222 transmitted by transmitter 210 may have elliptical polarization). In some embodiments, the first phase value has quantized or discrete increments. However, first phase value may be continuous.

In some embodiments, the first phase value is based on feedback received from another circuit (such as receiver 310 in FIG. 3A and/or receiver 340 in FIG. 3B) that receives signals 222 transmitted by transmitter 210. In particular, the feedback may be based on a relative phase of these signals at the other circuit. For example, the first phase value may be determined and/or selected so that the modulated electrical signals in the signals 222 are orthogonal at the receiver.

Moreover, the relative phase may be determined and/or selected to maximize the received power at the other circuit. For example, the first phase value may be adjusted to maximize the received samples associated with the main (e.g., direct) communication path between the transmitter 210 and the receiver, as opposed to samples associated with other (weaker or indirect) communication paths (e.g., those associated with multi-path signals).

Consequently, in some embodiments control logic 224 determines and/or selects the first phase value based on the feedback and adjusts the phase-adjustment element 220-1. Alternatively, the feedback may include the first phase value, which is provided to the phase-adjustment element 220-1. Moreover, the first phase value may be adjusted once, after a time interval (such as that associated with a block of data), and/or as needed. For example, the first phase value may be adjusted during normal operation and/or during a calibration mode of operation. Note that the first phase value (which is either received by or determined by the transmitter 210) may be stored in optional memory 226.

Signals 222 may be coupled to one or more antennas (such as antennas 112 in FIG. 1A) and/or antenna elements 162 (FIG. 1B). Note that the antennas and/or antenna elements may be: external to the transmitter 210, on-chip, on the package or chip carrier, and/or on another integrated circuit (for example, in a chip stack). As noted previously, these antennas and/or antenna elements may be associated with different polarizations of signals 222 transmitted by transmitter 210. Thus, signals 222-1 may be associated with a first polarization (such as a horizontal polarization or a right-circular polarization) and signals 222-2 may be associated with a second polarization (such as a vertical polarization or a left-circular polarization). Consequently, the polarizations may be substantially orthogonal.

In some embodiments, the antennas and/or antenna elements are used to provide spatial diversity (such as multiple-input multiple-output communication) and/or polarization diversity. For example, the antennas and/or antenna elements may provide directional gain over a range of transmit angles, thereby providing more robust communication between the devices 110 (FIGS. 1A and 1B) when obstacles disrupt at least a portion of the communication channel 116 (FIGS. 1A and 1B). In some embodiments, signals 222 transmitted by different antennas and/or antenna elements are distinguished from each other based on: encoding (such as TDMA, FDMA, and/or CDMA), spatial diversity, and/or polarization diversity. Note that in some embodiments each of the antennas and/or antenna elements is used to transmit signals 222 corresponding to a given sub-channel in the communication channel 116 (FIGS. 1A and 1B).

Moreover, in some embodiments beam forming is used to provide directional communication between the devices 110 (FIGS. 1A and 1B). For example, phase encoding of the signals 222 transmitted by two or more of the antennas and/or antenna elements may be used to provide: a directional antenna pattern, shaped beams, and/or to change a transmit direction associated with one or more of the shaped beams.

Signals 222 transmitted by transmitter 210 may combine (by linear superposition) in the communication channel 116 (FIGS. 1A and 1B). The resulting signals may include a QPSK signal which corresponds to the first modulated electrical signal and the second modulated electrical signal. As discussed further below, a receiver (such as the receiver 310 in FIG. 3A and/or the receiver 340 in FIG. 3B) receives these signals and detects the data x(n) 212 from the modulated electrical signals.

Figure 2B:
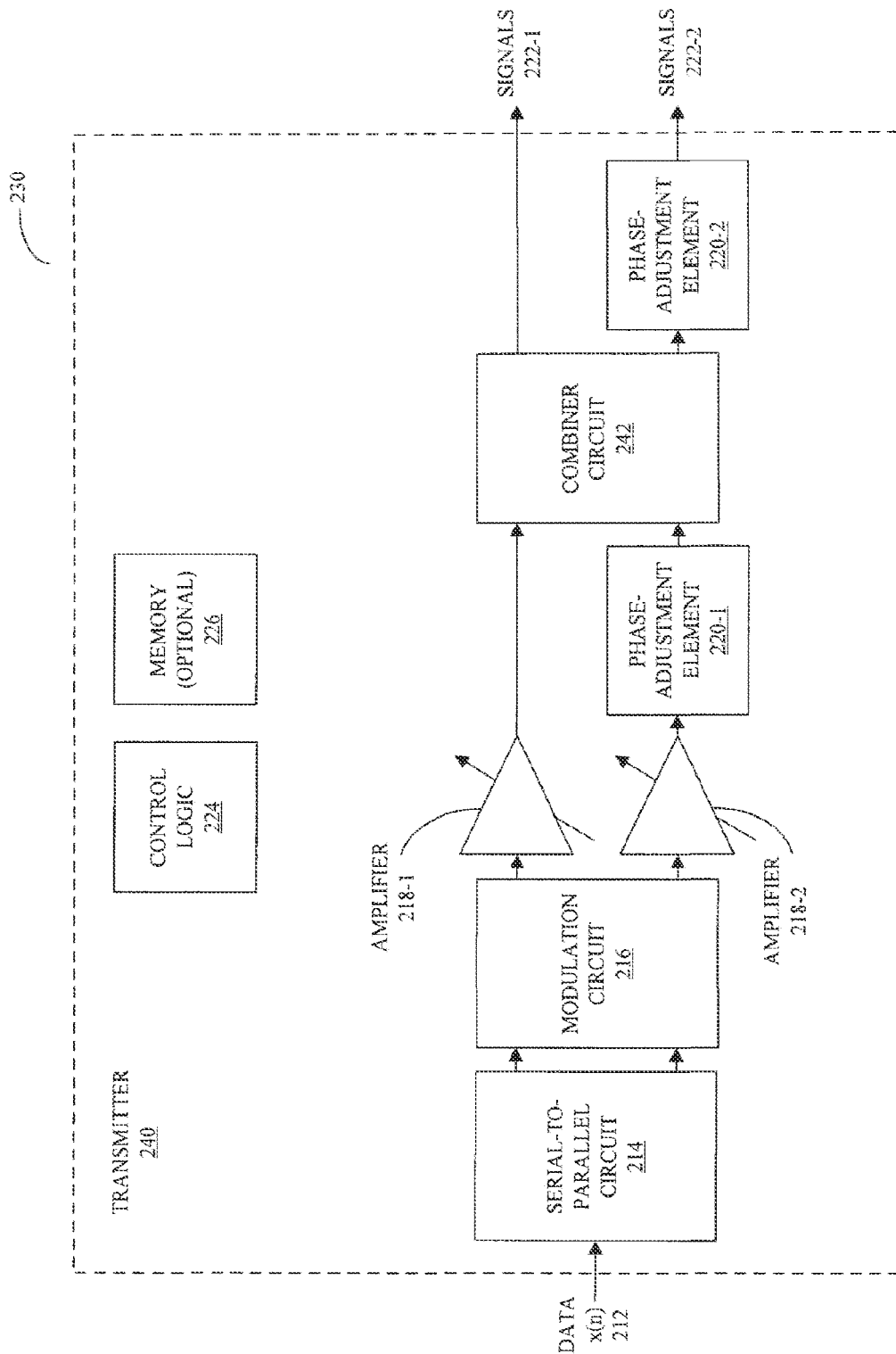
FIG. 2B is a block diagram illustrating an embodiment of a transmitter communication circuit.

However, in some embodiments signals 222 may be combined prior to transmission, which may reduce or eliminate the impact of fading of a polarization in the communication channel 116 (FIGS. 1A and 1B) and thereby may reduce or eliminate the potential loss of one data stream. This is shown in FIG. 2B, which presents a block diagram illustrating an embodiment 230 of a transmitter 240 communication circuit. Combiner circuit 242 receives the first modulated electrical signal and the second modulated electrical signal and outputs a first combined electrical signal and a second combined electrical signal. In some embodiments, the first combined electrical signal includes a sum of the first modulated electrical signal and the second modulated electrical signal and the second combined electrical signal includes a difference of the first modulated electrical signal and the second modulated electrical signal.

In some embodiments, phase-adjustment element 220-2 sets a relative phase between the first combined electrical signal and the second combined electrical signal based on a second phase value of the second phase-adjustment element. This second phase-adjustment element 220-2 may correct for phase errors between the two modulated electrical signals that can occur during combining in the combiner circuit 242. Note that in general the second phase value set by phase-adjustment element 220-2 may take on an arbitrary value, i.e., signals 222 transmitted by transmitter 240 may have elliptical polarization. In some embodiments, the second phase value has quantized or discrete increments. However, in other embodiments the second phase value may be continuous.

In some embodiments, the second phase value of the phase-adjustment element 220-2 (separately or in addition to the first phase value of the phase-adjustment element 220-1) may be based on feedback received from the other circuit (such as receiver 310 in FIG. 3A and/or receiver 340 in FIG. 3B) that receives the signals 222 transmitted by transmitter 240. In particular, the feedback may be based on a relative phase of signals 222 at the other circuit. For example, the phase values of either or both of the phase-adjustment elements 220 may be determined and/or selected so that the modulated electrical signals in the signals 222 are orthogonal at the receiver. However, in some embodiments the second phase value may be adjustable and the first phase value may be fixed (for example, at 90°).

Moreover, the relative phases of either or both of the phase-adjustment elements 220 may be determined and/or selected to maximize the received power. For example, either or both of the phase value(s) may be adjusted to maximize the received samples associated with the main (e.g., direct) communication path between the transmitter 240 and the receiver, as opposed to samples associated with other (weaker or indirect) communication paths (e.g., those associated with multi-path signals).

Consequently, in some embodiments control logic 224 determines and/or selects either or both of the phase value(s) based on the feedback and adjusts either or both of the phase-adjustment elements 220. Alternatively, the feedback may include either or both of the phase value(s), which are provided to either or both of the phase-adjustment elements 220. Moreover, either or both of the phase value(s) may be adjusted once, after a time interval (such as that associated with a block of data), and/or as needed. For example, either or both of the phase value(s) may be adjusted during normal operation and/or during a calibration mode of operation. Note that the phase value(s) (which are either received by or determined by the transmitter 240) may be stored in optional memory 226.

Figure 3A:
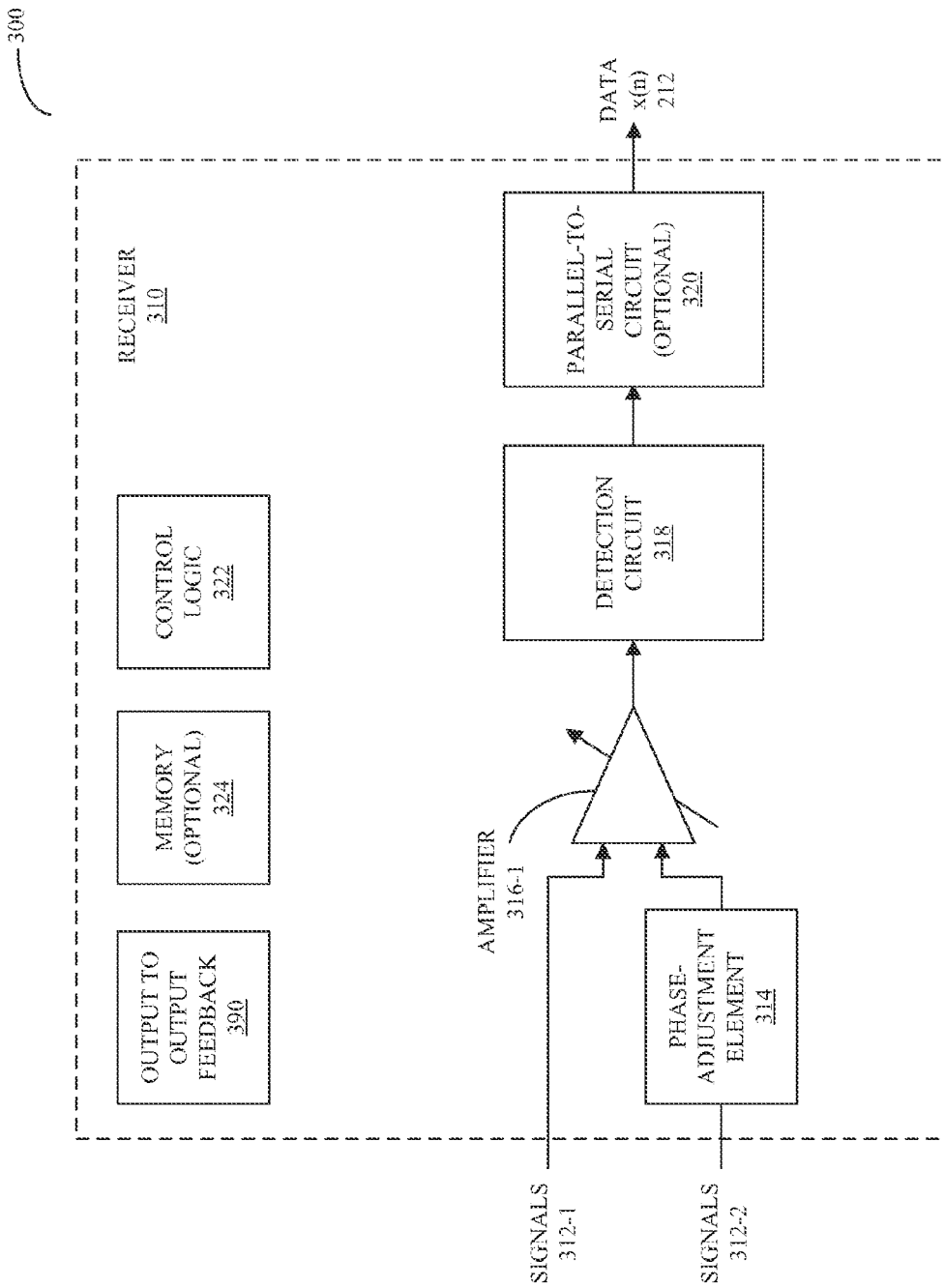
FIG. 3A is a block diagram illustrating an embodiment of a receiver communication circuit.

FIG. 3A presents a block diagram illustrating an embodiment 300 of the receiver 310 communication circuit, which may be used in devices 110 (FIGS. 1A and 1B). This receiver may be used to: receive signals transmitted by transmitter 210 (FIG. 2A) and/or 240 (FIG. 2B); to set an adjustable phase value representing the relative phase difference between electrical signals corresponding to the signals; and to demodulate and detect the modulated data in these electrical signals. In some embodiments, the receiver determines one or more multi-path signals that contr1Bute to the signals, and thus, to electrical signals, and uses this information to adjust the relative phase (and thus, to reduce or eliminate the impact of the one or more multi-path signals).

In particular, signals are received using one or more antennas (such as antennas 114 in FIG. 1A) and/or antenna elements 166 (FIG. 1B). Note that the antennas and/or antenna elements may be: external to the receiver 310, on-chip, on the package or chip carrier, and/or on another integrated circuit (for example, in a chip stack). As noted previously, these antennas and/or antenna elements may be associated with different polarizations of signals received by receiver 310. Thus, (electrical) signals 312-1 may be associated with a first polarization (such as a horizontal polarization or a right-circular polarization) and (electrical) signals 312-2 may be associated with a second polarization (such as a vertical polarization or a left-circular polarization). Consequently, the polarizations may be substantially orthogonal. Note that signals 312 may include a QPSK signal, including the two independent MSK-modulated data streams transmitted by transmitter 210 (FIG. 2A) and/or 240 (FIG. 2B).

Then, phase-adjustment element 314 sets a relative phase between signal 312-1 and signal 312-2 based on a third phase value of the phase-adjustment element 314. In exemplary embodiment, the relative phase is 90°, i.e., such that the signals 312 are orthogonal. However, in some embodiments the third phase value may be adjustable, for example, to increase the received power, to reduce or eliminate distortion (such as antenna mismatch or cross-polarization distortion), and/or to reduce or eliminate multi-path signals. For example, the third phase value may be adjusted to maximize the received samples associated with the main (e.g., direct) communication path between the transmitter and the receiver 310, as opposed to samples associated with other (weaker or indirect) communication paths (e.g., those associated with multi-path signals). This may be accomplished by focusing on the samples associated with the main or central tap in an equalizer in the receiver. Alternatively, the mean height of an eye pattern may be used. Note that var1Ations or noise about the mean height provide a metric that includes the contribution of the one or more multi-path signals to the signals 312. Also note that by optimizing these received samples, a range of times during which the received samples are received may be reduced or minimized, thereby reducing the delay-spread distortion (in which similar or identical signals arrive at different times at a receiver), i.e., to reduce the impact of multi-path signals and to mitigate the associated degradation of the signal condition, without significant additional power consumption.

In general, the third phase value set by phase-adjustment element 314 may take on an arbitrary value, i.e., signals received by receiver 310 may have elliptical polarization. In some embodiments, the third phase value has quantized or discrete increments. However, in other embodiments the third phase value may be continuous. Note that the third phase value of phase-adjustment element 314 may different from the first phase value and/or the second phase value in transmitter 210 (FIG. 2A) and/or 240 (FIG. 2B).

In some embodiments, receiver 310 includes control logic 322 which determines a phase relationship between the signals 312 and determines the third phase value based on the phase relationship. As noted previously, receiver 310 may also determine the first phase value and/or the second phase value to be used by transmitter 210 (FIG. 2A) and/or 240 (FIG. 2B), for example, using an auto-negotiation technique, and may communicate either or both of these phase values to the transmitter 210 (FIG. 2A) and/or 240 (FIG. 2B). Alternatively, the receiver 310 may provide information in feedback to the transmitter 210 (FIG. 2A) and/or 240 (FIG. 28) that is used by control logic 224 (FIGS. 2A and 2B) to determine the first phase and/or the second phase value. For example, the feedback may include the ratio of two polarization components (such as the ratio of signals 312) and/or the sum of two polarization components. More generally, the receiver 310 may provide feedback to the transmitter 210 (FIG. 2A) and/or 240 (FIG. 28) and this feedback may be based on the characterization of the performance, i.e., a performance metric, such as the signal condition, of the communication channel 116 (FIGS. 1A and 1B).

Note that the third phase value and/or the feedback may be determined and/or selected once, after a time interval (such as that associated with a block of data), and/or as needed. For example, the third phase value and/or the feedback may be adjusted or revised during normal operation and/or during a calibration mode of operation. Moreover, the third phase value may be stored in optional memory 324. Additionally, embodiment 300 of the receiver 310 can include output to output feedback 390 (an output to output feedback, although not shown in FIG. 3B, may also be included in the embodiment 330 of the receiver 340 shown in FIG. 3B.

Next, the signals 312 are amplified using amplifier 316-1. In some embodiments, amplifier 316-1 has a variable or an adjustable gain. Then, detection circuit 318 may detect and demodulate the signals 312 to recover the two MSK-modulated data streams, which are then combined in optional parallel-to-serial circuit 320 to provide the data x(n) 212. In particular, detection circuit 318 may perform: baseband demodulation (for example, using a Fast Fourier Transform or FFT), equalization (such as linear or non-linear equalization), data-symbol detection (using slicers and/or sequence detection), and baseband decoding. For example, the baseband decoding may include symbol-to-hit encoding that is the opposite or the inverse of the bit-to-symbol encoding performed prior to transmitting the signals (such as that used in the two independent MSK encoding operations). Moreover, in some embodiments the receiver 310 implements error detection and/or correction. For example, errors may be detected by performing a multi-bit XOR operation in conjunction with one or more parity bits in the transmitted signals 222 (FIGS. 2A and 2B).

Before, during or after the amplification by the amplifier 316-1, the received signals 312 may be converted to digital electrical signals using an analog-to-digital converter (ADC) and RF down-converted to baseband from one or more appropr1Ate frequency bands using one or more carrier frequencies} i associated with one or more sub-channels. For example, the down-conversion may use frequency-conversion elements, such as one or more heterodyne mixers or modulators. Moreover, in some embodiments the amplifier 316-1 may adjust the gain in the receiver 310, for example, based on an automatic gain control (AGC) loop.

Figure 3B:
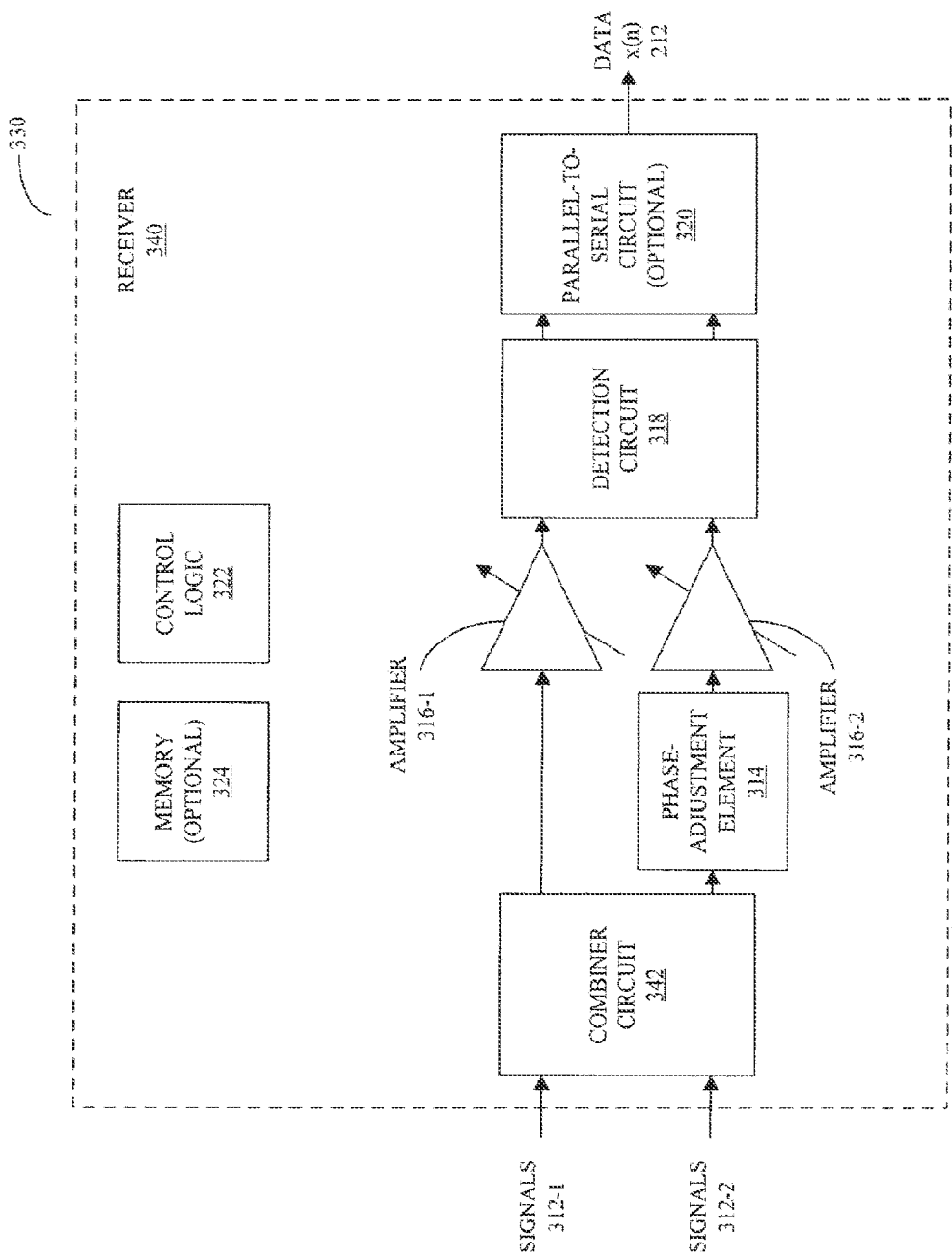
FIG. 3B is a block diagram illustrating an embodiment of a receiver communication circuit.

In some embodiments, received signals 312 are combined prior to setting the relative phase (for example, to reduce or eliminate the impact of fading of a polarization in the communication channel 116 in FIGS. 1A and 1B). This is shown in FIG. 3B, which presents a block diagram illustrating an embodiment 330 of the receiver 340 communication circuit. In particular, combiner circuit 342 receives signal 312-1 and signal 312-2 and outputs a first combined electrical signal and a second combined electrical signal. In some embodiments, the first combined electrical signal includes a sum of the signals 312 and the second combined electrical signal includes a difference of the signals 312.

Note that receiver 340 includes another amplifier 316-2, which allows the first combined electrical signal and the second combined electrical signal to be amplified independently. In some embodiments, outputs from the amplifiers 316 are then processed separately in detection circuit 318 and/or optional parallel-to-ser1A1 circuit 320.

Note that transmitter 210 (FIG. 2A), transmitter 240 (FIG. 2B), receiver 310 (FIG. 3A), and/or receiver 340 may include fewer components or additional components. For example, there may be additional antennas (or antenna elements) and/or signal lines coupling components may indicate multiple signal lines (or a bus). In some embodiments, transmitter 210 (FIG. 2A) and/or 240 (FIG. 2B) include pre-emphasis to compensate for losses and/or dispersion associated with the communication channel 116 (FIGS. 1A and 1B). Similarly, in some embodiments the receiver 310 (FIG. 3A) and/or 340 includes equalization. Note that pre-emphasis and/or equalization may be implemented using feed-forward filters and/or decision-feedback-equalization circuits.

Moreover, while not explicitly shown in transmitter 210 (FIG. 2A), transmitter 240 (FIG. 2B), receiver 310 (FIG. 3A), and receiver 340, these circuits may include memory buffers for the electrical signals. In addition, clocking circuits are not explicitly illustrated in transmitter 210 (FIG. 2A), transmitter 240 (FIG. 2B), receiver 310 (FIG. 3A), and receiver 340. Nonetheless, electrical signals may be transmitted and/or received based on either or both edges in one or more clock signals. Note that in some embodiments transmitting and receiving may be synchronous and/or asynchronous.

Components and/or functionality illustrated in transmitter 210 (FIG. 2A), transmitter 240 (FIG. 2B), receiver 310 (FIG. 3A), and receiver 340 may be implemented using analog circuits and/or digital circuits. Furthermore, components and/or functionality in these communication circuits may be implemented using hardware and/or software. In some embodiments, control logic 224 (FIGS. 2A and 2B) and/or 322 (FIGS. 3A and 3B) operate on physical-layer structures (such as an RF front-end) in the transmitter 210 (FIG. 2A), transmitter 240 (FIG. 2B), receiver 310 (FIG. 3A), and/or receiver 340 without using information from baseband-processing components.

Note that two or more components in transmitter 210 (FIG. 2A), transmitter 240 (FIG. 2B), receiver 310 (FIG. 3A), and/or receiver 340 may be combined into a single component and/or the position of one or more components may be changed. Thus, the phase value(s) may be set or adjusted before or after the amplifiers 218 (FIGS. 2A and 2B) and/or 316 (FIGS. 3A and 3B). In some embodiments, transmitter 210 (FIG. 2A), transmitter 240 (FIG. 2B), receiver 310 (FIG. 3A) and/or receiver 340 are included in one or more integrated circuits on one or more semiconductor die.

In an exemplary embodiment, the first phase value in transmitter 210 (FIG. 2A) and/or the combination of the first phase value and the second phase value in transmitter 240 (FIG. 2B) result in a relative phase of 90° between signals 222 (FIGS. 2A and 2B). These signals are then each transmitted with a circular polarization. For example, signal 222-1 (FIGS. 2A and 2B) may be associated with a right-circular polarization and signal 222-2 (FIGS. 2A and 2B) may be associated with a left-circular polarization. Moreover, signals 222 (FIG. 2A) may be combined during propagation through communication channel 116 (FIGS. 1A and 1B) or prior to transmission to produce a QPSK signal.

In general, the signals received by receiver 310 (FIG. 3A) and/or 340 are elliptical. Thus, the third phase value may be set or adjusted such that the relative phase between the signals 312 is once again 90°. This phase relationship may facilitate the recovery of the two independently modulated MSK data streams.

By using MSK-modulated data streams in conjunction with a relative phase, the advantages of: a constrained power spectral density, ease of equalization, and a spectral efficiency of 2 bits/Hz may be achieved. Moreover, as discussed below, these techniques also facilitate efficient amplification. In particular, by amplifying after the MSK modulation these techniques lead to the surprise result of at least a 3 dB gain in signal-to-noise ratio because MSK-modulated signals have a constant envelope (and thus, an improved peak-to-average power ratio or PAPR).

We now described embodiments of MSK and QPSK signals. FIG. 4A presents a graph 400 illustrating an amplitude 410-1 envelope as a function of time 412 for an embodiment of components of an MSK signal, including an in-phase component I 414 and an out-of-phase component Q 416. Note that the amplitude envelopes of these components are half-sinusoid waveforms. As noted previously, MSK signals are a linear representation of CPM signals, which allows the use of linear equalization. Moreover, the phase changes occur at the zero-crossing points, which reduces the size of the resulting sidebands and thus the bandwidth used by MSK signals.

FIG. 4B presents a graph 450 illustrating an embodiment of a MSK signal. In particular, amplitude 410-1 of I 414 (FIG. 4A) and amplitude 410-2 of Q 416 (FIG. 4A) are shown as a function of time 412. Note that the MSK signal includes two frequency-shift keying signals or components with a relative phase of 90°. Moreover, data (such as data x(n) 212 in FIGS. 2A and 2B) alternately modulates the I 414 (FIG. 4A) and the Q 416 (FIG. 4A) components resulting in a spectral efficiency of 1 bit/Hz.

Figure 5A:
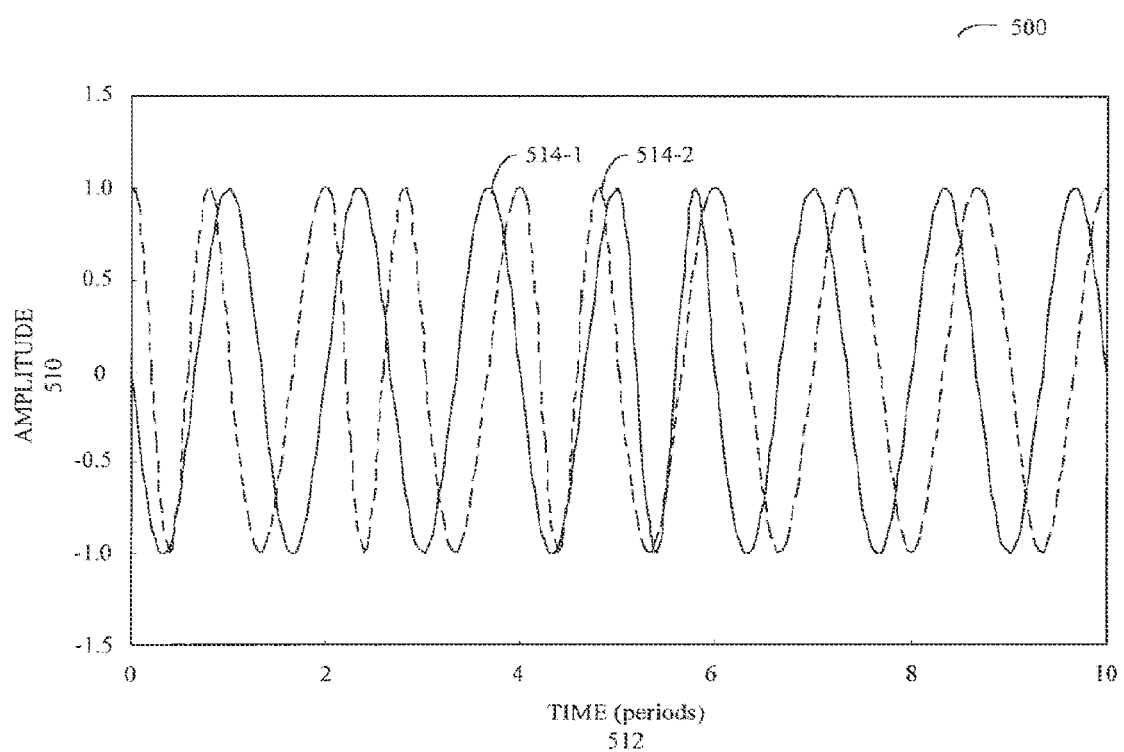
FIG. 5A is a graph illustrating an embodiment of minimum shift-keying signals.
Figure 5B:
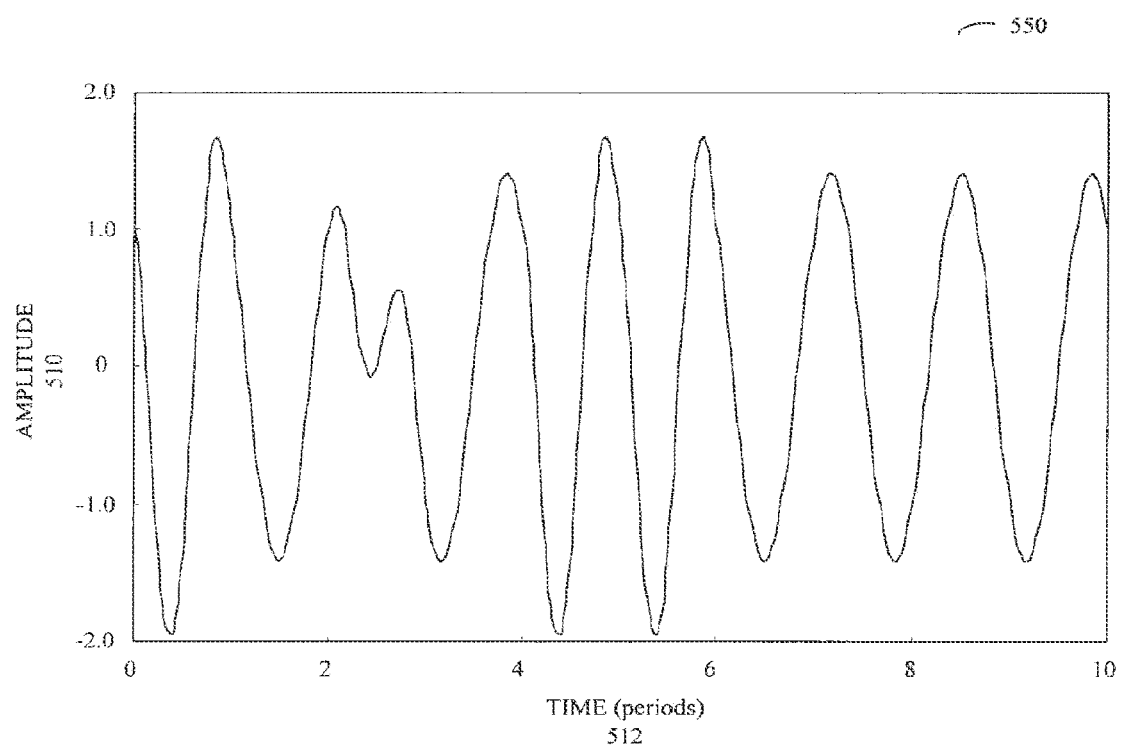
FIG. 5B is a graph illustrating an embodiment of a quadrature phase-shift-keying signal.

FIG. 5A presents a graph 500 illustrating amplitude 510 as a function of time 512 (in clock periods) for an embodiment of MSK signals 514. By combining two independent MSK signals (phase shifted by 90°), a QPSK signal with a spectral efficiency of 2 bits/Hz may be obtained. This is shown in FIG. 5B, which presents a graph 550 illustrating amplitude 510 as a function of time 512 (in clock periods) for an embodiment of a QPSK signal. Note that the combined signal does not have a constant envelope while the MSK signals 514 (FIG. 5A) have a constant envelope. In an exemplary embodiment, the QPSK signal has a PAPR of 6 dB. Consequently, amplifying the MSK signals prior to combining (as illustrated in FIGS. 2A and 2B) facilitates the use of more efficient amplifiers.

Figure 6:
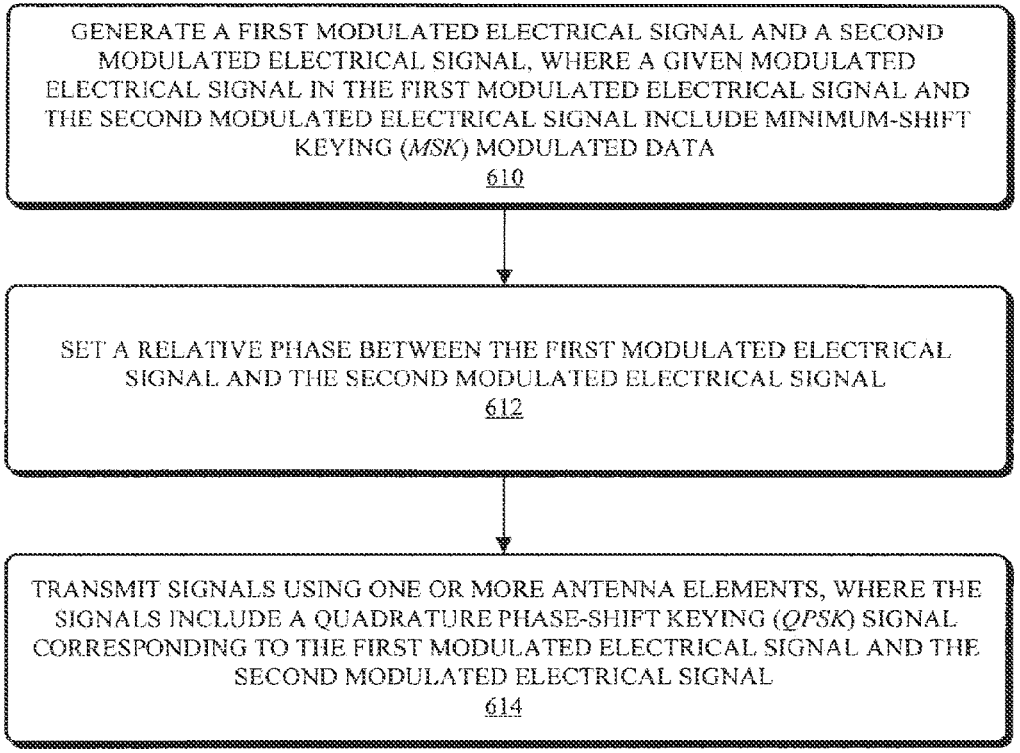
FIG. 6 is a flow chart illustrating an embodiment of a process for transmitting signals.

We now describe embodiments of a process for communicating data. FIG. 6 presents a flow chart illustrating an embodiment of a process 600 for transmitting signals, which may be performed by a device (such as one of the devices 110 in FIGS. 1A and 1B). During operation, the device generates a first modulated electrical signal and a second modulated electrical signal (610), where a given modulated electrical signal in the first modulated electrical signal and the second modulated electrical signal includes minimum-shift keying (MSK) modulated data. Next, the device sets a relative phase between the first modulated electrical signal and the second modulated electrical signal (612). Then, the device transmits the signals using one or more antenna elements (614), where the signals include a quadrature phase-shift-keying (QPSK) signal corresponding to the first modulated electrical signal and the second modulated electrical signal.

FIG. 7 presents a flow chart illustrating an embodiment of a process 700 for receiving signals, which may be performed by another device (such as one of the devices 110 in FIGS. 1A and 1B). During operation, this other device receives a first electrical signal using a first antenna element and a second electrical signal using a second antenna element (710), where a given electrical signal in the first electrical signal and the second electrical signal includes a quadrature phase-shift-keying (QPSK) signal. Next, the other device sets a relative phase between the first electrical signal and the second electrical signal (7I 2).

Note that in some embodiments there may be additional or fewer operations in process 600 (FIG. 6) and/or process 700. Moreover, the order of the operations may be changed, and two or more operations may be combined into a single operation.

We now describe additional communication circuits that may be used in either of the devices I 10 (FIGS. 1A and 1B). In the discussion that follows, an adjustable elliptical polarization (which may include a circular polarization) is used in the transmit circuit (henceforth, transmitter) and/or receive circuit (henceforth, receiver), i.e., there is an adjustable phase angle between signal components at the transmitter and/or at the receiver. This elliptical polarization may be adjusted once, after a time interval (such as that associated with a block of data), and/or as needed. For example, the elliptical polarization of the transmit signals may be dynamically adjusted based on the signal condition, e.g., based on the feedback from the receiver. Note that the phase angle(s) may be adjusted during normal operation and/or during a calibration mode of operation. Moreover, the elliptical polarization(s) may be set or adjusted: to reduce losses associated with the mismatch of antennas 112 and 114 (FIGS. 1A and 1B); to reduce losses associated with cross polarization effects; and/or to reduce losses associated with the delay-spread distortion of the communication channel 116 (FIGS. 1A and 1B) (in which similar or identical signals arrive at different times at a receiver), i.e., to reduce the impact of multi-path signals and to mitigate the associated degradation of the signal condition, without significant additional power consumption.

Figure 8A:
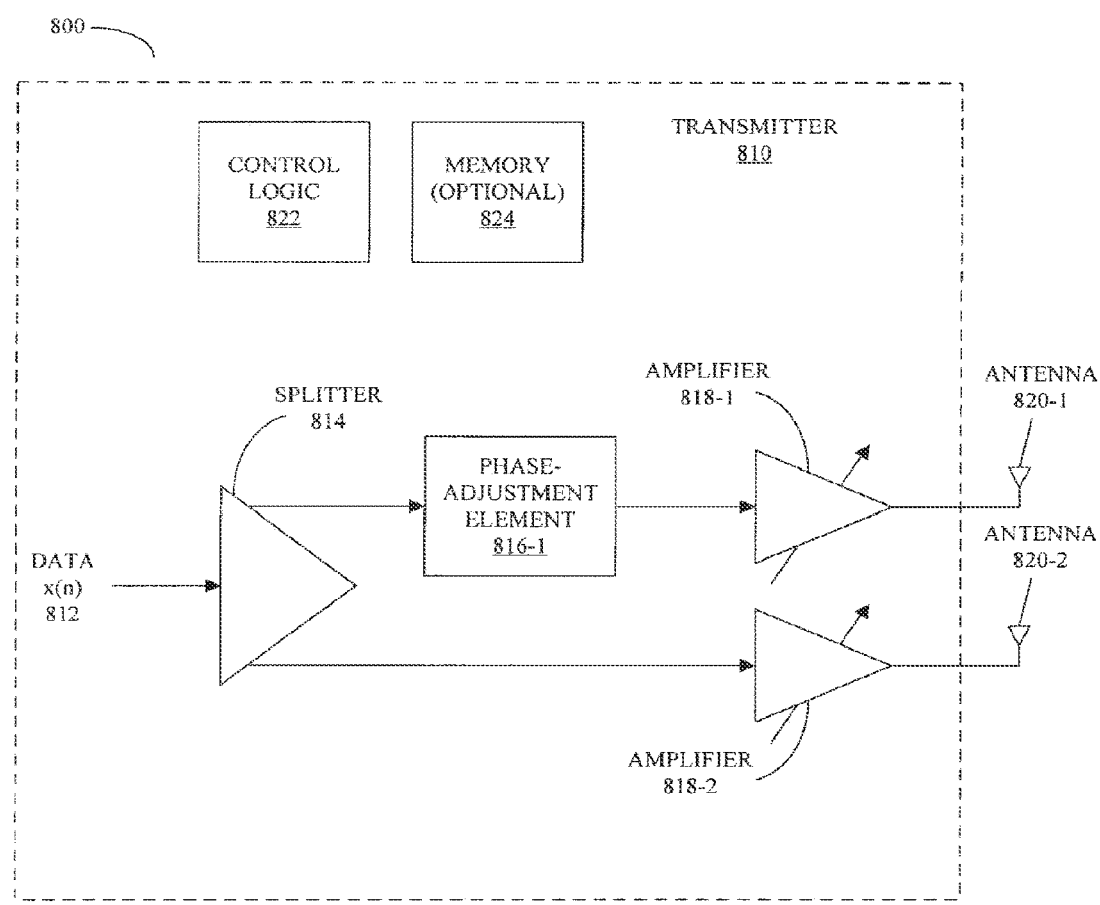
FIG. 8A is a block diagram illustrating an embodiment of a transmitter communication circuit.

FIG. 8A presents a block diagram illustrating an embodiment 800 of a transmitter 810 communication circuit, which may be used in devices 110 (FIGS. 1A and 1B). This transmitter may be used to: receive data x(n) 812; to set an adjustable phase value representing the relative phase difference between electrical signals to be transmitted; and to transmit these electrical signals. While the data x(n) 812 may be at least partially encoded, in some embodiments additional encoding or modulation of the data x(n) 8I 2 occurs in the transmitter 810. For example, control logic 822 may encode or modulate the data x(n) 8I 2 based on look-up tables stored in optional memory 824 and/or using dedicated circuits (such as an Inverse Fast Fourier Transform or IFFT).

Note that encoding should be understood to include modulation coding and/or spread-spectrum encoding, for example, coding based on binary pseudorandom sequences (such as maximal length sequences or m-sequences), Gold codes, and/or Kasami sequences. Furthermore, modulation coding may include bit-to-symbol coding, in which one or more data bits are mapped together to a data symbol. For example, a group of two data bits can be mapped to: one of four different amplitudes of an encoded electrical data signal; one of four different phases of a sinusoid; or a combination of one of two different amplitudes of a sinusoid and one of two different phases of the same sinusoid (such as in quadrature amplitude modulation or QAM).

In general, the modulation coding may include: amplitude modulation, phase modulation, and/or frequency modulation, such as pulse amplitude modulation (PAM), pulse width modulation, and/or pulse code modulation. For example, the modulation coding may include: two-level pulse amplitude modulation (2-PAM), four-level pulse amplitude modulation (4-PAM), eight-level pulse amplitude modulation (8-PAM), sixteen-level pulse amplitude modulation (16-PAM), two-level on-off keying (2-OOK), four-level on-off keying (4-OOK), eight-level on-off keying (8-OOK), and/or sixteen-level on-off keying (16-OOK). In addition, as noted previously, the data x(n) 812 maybe encoded using TDMA, FDMA, and/or CDMA.

In some embodiments, the modulation coding includes non-return-to-zero (NRZ) coding. Furthermore, in some embodiments the modulation coding includes two- or more-level QAM. Note that different sub-channels in the communication channel 116 (FIGS. 1A and 1B) may be encoded differently and/or the modulation coding may be dynamically adjusted. Thus, in some embodiments the number of bits per symbol in the data x(n) 812 and/or in one or more of the sub-channels is dynamically adjusted (for example, based on the signal condition in the communication channel 116 in FIGS. 1A and 1B), thereby modifying the corresponding data rate(s).

In some embodiments, at least a portion of the data x(n) 812 includes error-detection-code (EDC) information and/or error-correction-code (ECC) information. For example, pre-existing ECC information may be incorporated into at least a portion of the data x(n) 812 (such as in one or more data packets). Alternatively, ECC information may be dynamically generated (i.e., in real time) based on at least a portion of the data x(n) 812, and this ECC information may then be included with the transmitted signals.

In some embodiments, the ECC includes a Bose-Chaudhuri-Hochquenghem (BCH) code. Note that BCH codes are a sub-class of cyclic codes. In exemplary embodiments, the ECC includes: a cyclic redundancy code (CRC), a parity code, a Hamming code, a Reed-Solomon code, and/or another error checking and correction code.

Next, splitter 814 may split electrical signals corresponding to the data x(n) 812 into two or more electrical signals. As discussed further below, these electrical signals may correspond to different polarization components of transmit signals to be transmitted by the transmitter 810. Then, a relative phase value between these electrical signals may be set using phase-adjustment element 816-1. This adjustment of the relative phase value may be based on instructions from control logic 822. For example, as discussed previously, a receiver may provide feedback to the transmitter 810, and the transmitter 810 may use this feedback to determine and/or adjust the phase value. In some embodiments, the feedback includes the phase value. Moreover, in some embodiments the phase value (which is either received by or determined by the transmitter 810) is stored in optional memory 824.

Then, the electrical signals maybe amplified by amplifiers 818-1 and transmitted using antennas 820. In some embodiments, either or both amplifiers 818 have variable or adjustable gain. Before, during or after this amplification, the electrical signals may be converted to analog electrical signals using a digital-to-analog converter (DAC) and RF up-converted to one or more appropr1Ate frequency bands using one or more carrier frequencies $f_i$ associated with one or more sub-channels. For example, the up-conversion may use frequency-conversion elements, such as one or more heterodyne mixers or modulators.

Note that each of the antennas 820 may be used to transmit one of the electrical signals using an associated polarization. For example, antenna 820-1 may transmit a vertical linear polarization and antenna 820-2 may transmit a horizontal linear polarization. However, in other embodiments the antennas 820 have, respectively, right- and left-circular polarizations. Thus, the polarizations may be substantially orthogonal.

In general, the phase value set by phase-adjustment element 816-1 may take on an arbitrary value, i.e., the transmitted signals have elliptical polarization. In some embodiments, the phase value is between −90° and 90°. For example, the phase value may be quantized using 15° increments. However, in other embodiments the phase value may be continuous.

Moreover, in some embodiments the electrical signals may have the same amplitude, i.e., only the relative phase value is adjusted. However, in other embodiments the relative amplitudes of the electrical signals or the relative signal powers are different.

Note that the antennas 820 may be separate antennas or may be separate elements in a single antenna (such as a phased-array antenna). Moreover, the antennas 820 (or antenna elements) may be: external to the transmitter 810, on-chip, on the package or chip carrier, and/or on another integrated circuit (for example, in a chip stack).

In some embodiments, the antennas 820 are used to provide spatial diversity (such as multiple-input multiple-output communication) and/or polarization diversity. For example, the antennas may provide directional gain over a range of transmit angles, thereby providing more robust communication between the devices 110 (FIGS. 1A and 1B) when obstacles disrupt at least a portion of the communication channel 116 (FIGS. 1A and 1B). In some embodiments, signals transmitted by different antennas in the antennas 820 are distinguished from each other based on: encoding (such as TDMA, FDMA, and/or CDMA), spatial diversity, and/or polarization diversity. Note that in some embodiments each of the antennas 820 is used to transmit electrical signals corresponding to a given sub-channel in the communication channel 116 (FIGS. 1A and 1B).

Moreover, in some embodiments beam forming is used to provide directional communication between the devices 110 (FIGS. 1A and 1B). For example, phase encoding of the electrical signals transmitted by two or more of the antennas 820 may be used to provide: a directional antenna pattern, shaped beams, and/or to change a transmit direction associated with one or more of the shaped beams.

Figure 8B:
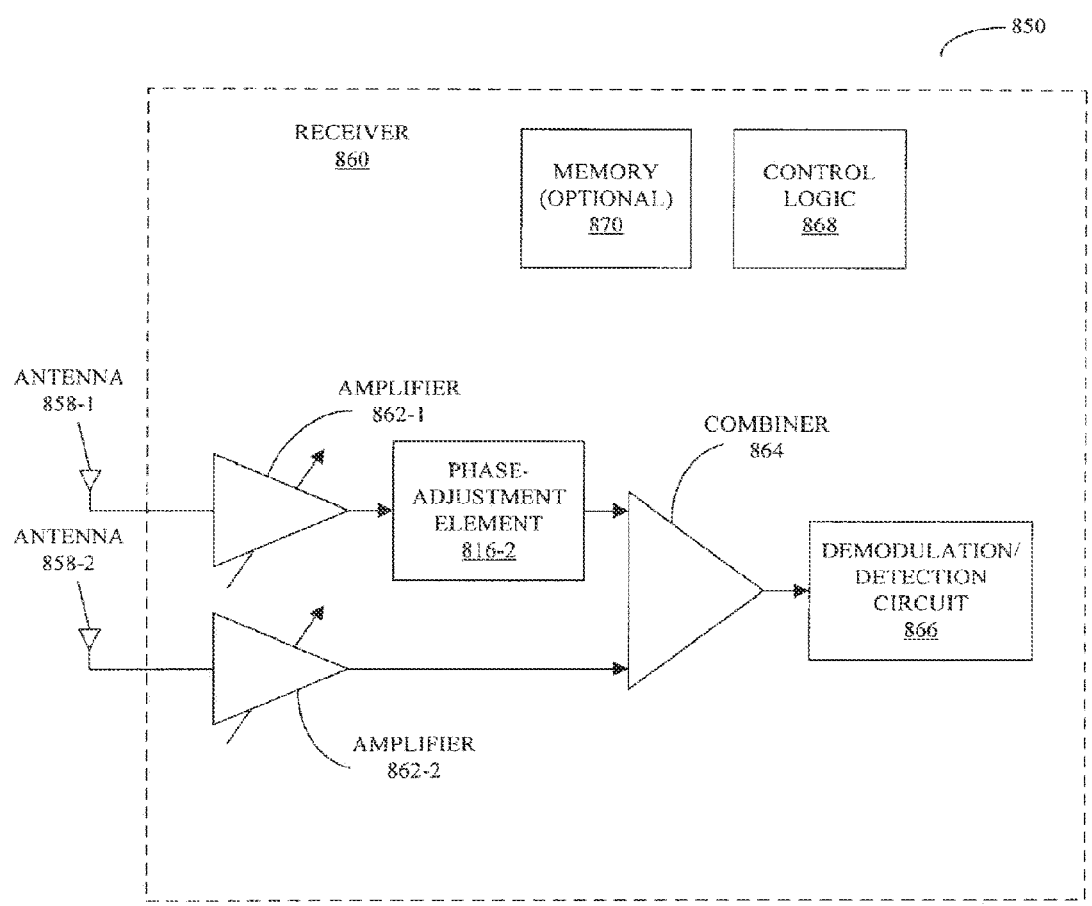
FIG. 8B is a block diagram illustrating an embodiment of a receiver communication circuit.
Figure 9:
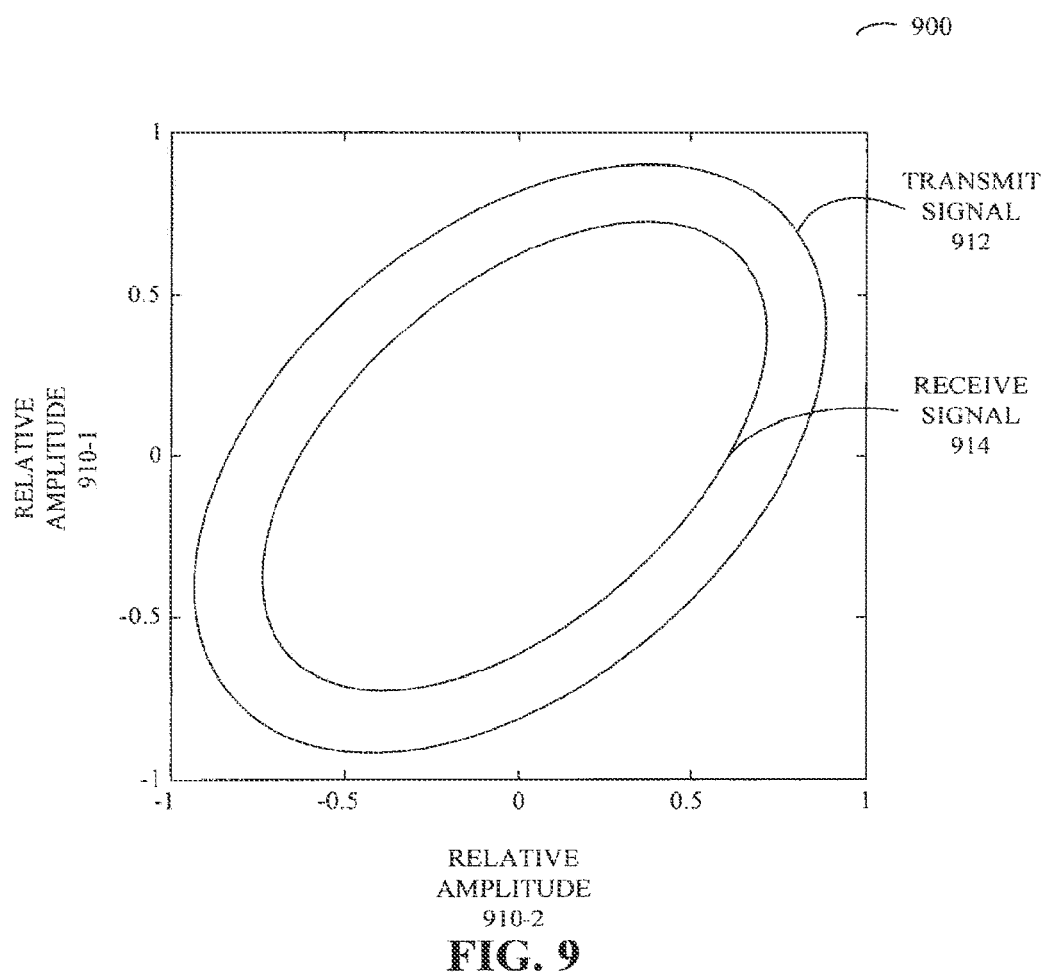
FIG. 9 is a graph illustrating transmit and receive signals for an embodiment of a communication system.

FIG. 8B presents a block diagram illustrating an embodiment 850 of a receiver 860 communication circuit, which may be used in devices 110 (FIGS. 1A and 1B). This receiver may be used to: receive signals transmitted by transmitter 810 (FIG. 8A); to determine one or more multi-path that contribute to the signals, and thus, to electrical signals corresponding to the signals; to set an adjustable phase value representing the relative phase difference between the electrical signals; and to demodulate and detect these electrical signals. As shown in FIG. 9, which presents a graph illustrating relative amplitudes 910 of transmit signal 912 and receive signal 914 for an embodiment 900 of a communication system, in general the received signal 914 is elliptically polarized. However, referring back to FIG. 8B, because of antenna mismatch, cross polarization and/or multi-path signals, the adjustable phase value set in the receiver 860 for the receive signal 914 (FIG. 9) may be different that the phase value set by the transmitter 810 (FIG. 8A) for the transmit signal 912 (FIG. 9).

In particular, signals transmitted by transmitter 810 (FIG. 8A) are received using antennas 858 and amplified using amplifiers 862. In some embodiments, either or both amplifiers 862 have variable or adjustable gain. Note that one of the antennas 858 may be associated with one polarization (such as horizontal linear polarization or right-circular polarization) and another of the antennas 858 may be associated with another polarization (such as vertical linear polarization or left-circular polarization). Thus, the received electrical signals may be associated with substantially orthogonal polarizations. Moreover, the antennas 858 may be separate or may be separate elements in a single antenna (such as a phased-array antenna).

Next, phase-adjustment-element 816-2 may set or adjust the relative phase value between the received electrical signals. This relative phase value may be determined or calculated previously using control logic 868 and stored in optional memory 870. For example, control logic 868 may determine the one or more multi-path signals and, as discussed further below, the relative phase value may be based, at least in part, on the one or more multi-path signals.

As noted previously, receiver 860 may also determine the phase value to be used by the transmitter 810 (FIG. 8A), for example, using an auto-negotiation technique, and may communicate this phase value to the transmitter 810 (FIG. 8A). Alternatively, the receiver 860 may provide information or feedback to the transmitter 810 (FIG. 8A) that is used by control logic 822 (FIG. 8A) to determine the phase value set by phase-adjustment element 816-1 (FIG. 8A). More generally, the receiver 860 may provide feedback to the transmitter 810 (FIG. 8A) and this feedback may be based on the characterization of the performance (i.e., a performance metric, such as the signal condition) and/or the contribution of the one or more multi-path signals to the signals, and thus, to the electrical signals (for example, the contribution to the combination of the electrical signals).

Note that the phase value set by phase-adjustment-element 816-1 (FIG. 8A) and/or phase-adjustment-element 816-2 may increase or maximize the received power associated with either or both of the electrical signals received by antennas 858 and/or reduced or minimizes the delay-spread distortion. Moreover, these phase values may reduce or eliminate the contribution of the multi-path signals to the signals communicated through communication channel 116 (FIGS. 1A and 1B).

Moreover, note that the phase value set by phase-adjustment element 816-2 may take on an arbitrary value. In some embodiments, the phase value is between $-90°$ and $90°$. For example, the phase value maybe quantized using $15°$ increments. However, in other embodiments the phase value may be continuous.

In some embodiments after setting or adjusting the relative phase value the received electrical signals may have the same amplitude, i.e., only the relative phase value is adjusted. However, in other embodiments the relative amplitudes of the received electrical signals or the relative signal powers are different.

After setting or adjusting the relative phase value, the electrical signals may be combined using combiner 864. Then, demodulation/detection circuit 866 may recover the data $x(n)$ 812 from the received electrical signals. In particular, demodulation/detection circuit 866 may perform: baseband demodulation (for example, using a Fast Fourier Transform or FFT), data-symbol detection (using slicers and/or sequence detection), and baseband decoding. For example, the baseband decoding may include symbol-to-bit encoding that is the opposite or the inverse of the bit-to-symbol encoding performed prior to transmitting the signals. Moreover, in some embodiments the receiver 860 implements error detection and/or correction. For example, errors may be detected by performing a multi-bit XOR operation in conjunction with one or more parity bits in the transmitted signals.

Before, during or after the amplification by the amplifiers 862, the received electrical signals may be converted to digital electrical signals using an analog-to-digital converter (ADC) and RF down-converted to baseband from one or more appropriate frequency bands using one or more carrier frequencies $f_i$ associated with one or more sub-channels. For example, the down-conversion may use frequency-conversion elements, such as one or more heterodyne mixers or modulators. Moreover, in some embodiments the amplifiers 862 may adjust the gain in the receiver 860, for example, based on an automatic gain control (AGC) loop.

Note that transmitter 810 (FIG. 8A) and/or receiver 860 may include fewer components or additional components. For example, there may be additional antennas 820 and/or 858 (or antenna elements) and/or signal lines coupling components may indicate multiple signal lines (or a bus). In some embodiments, transmitter 810 (FIG. 8A) and/or receiver 860 include pre-emphasis to compensate for losses and/or dispersion associated with the communication channel 116 (FIGS. 1A and 1B). Similarly, in some embodiments the receiver 860 includes equalization. Note that pre-emphasis and/or equalization may be implemented using feed-forward filters and/or decision-feedback-equalization circuits.

Moreover, while not explicitly shown in transmitter 810 (FIG. 8A) and receiver 860, these circuits may include memory buffers for the electrical signals. In addition, clocking circuits are not explicitly illustrated in transmitter 810 (FIG. 8A) and receiver 860. Nonetheless, electrical signals may be transmitted and/or received based on either or both edges in one or more clock signals. Note that in some embodiments transmitting and receiving may be synchronous and/or asynchronous.

Components and/or functionality illustrated in transmitter 810 (FIG. 8A) and/or receiver 860 may be implemented using analog circuits and/or digital circuits. Furthermore, components and/or functionality in either of these communication circuits may be implemented using hardware and/or software. In some embodiments, control logic 822 and/or 868 operates on physical-layer structures in the transmitter 810 (FIG. 8A) and/or receiver 860 (such as an RF front-end) without using information from baseband-processing components.

Note that two or more components in transmitter 810 (FIG. 8A) and/or receiver 860 may be combined into a single component and/or the position of one or more components may be changed. Thus, the phase value(s) may be set or adjusted before or after the amplifiers 818 (FIG. 8A) and/or 862. In some embodiments, transmitter 810 (FIG. 8A) and/or receiver 860 are included in one or more integrated circuits on one or more semiconductor die.

In an exemplary embodiment, transmitter 810 (FIG. 8A) initially transmits a signal having a circular polarization during calibration of the communication channel 116 (FIGS. 1A and 1B). Antennas 858 (FIG. 8B) may receive two components associated with this signal. For example, the components may be received independently using separate receive circuits in receiver 860 (FIG. 8B). Next, the receiver 860 (FIG. 8B) may provide feedback to the transmitter 810 (FIG. 8A), such as the ratio of the two components. Then, the control logic 822 may determine the phase value from the feedback and provide instructions to the phase-adjustment element 816-1, thereby setting the relative phase value between the electrical signals and, thus, setting the polarization of the transmitted signal 912 (FIG. 9). In some embodiments, the determined phase value maximizes the received power at the receiver 860 (FIG. 8B).

In another exemplary embodiment, receiver 860 (FIG. 8B) measures the summation of the received electrical signals. In this embodiment, optimization may occur using multiple iterations. For example, the transmitter 810 (FIG. 8A) and the receiver 860 (FIG. 8B) may repeat the operations of: transmitting a signal; determining the received power; providing feedback to the transmitter 810 (FIG. 8A); and determining and setting a new phase value of the transmitted signal. Note that this embodiment may be implemented using one receive circuit in the receiver 860 (FIG. 8B).

Figure 10A:
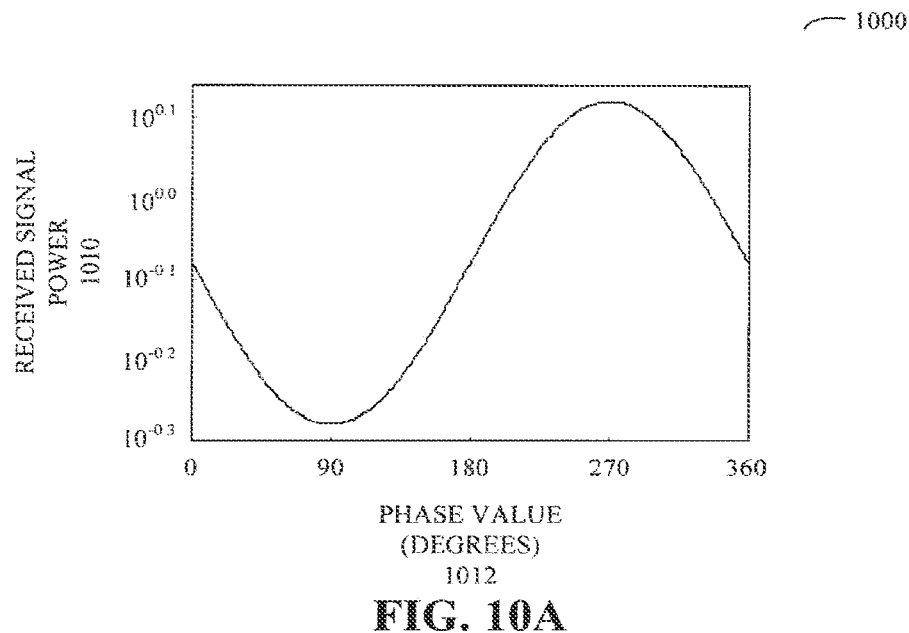
FIG. 10A is a graph illustrating received signal power as a function of phase value applied by a phase-adjustment element for an embodiment of a communication system.

As shown in FIG. 10A, which presents a graph illustrating received signal power 1010 as a function of phase value 1012 (in degrees) applied by a phase-adjustment element for an embodiment I 000 of a communication system, the inventors have unexpectedly discovered that by adjusting the phase value 1012 to effect an elliptical polarization, significant improvements in the received signal power 1010 may be obtained. In particular, relative to circular polarization (a phase value of 90°) the received signal power associated with an elliptical polarization may be increased by up to 5 dB.

Figure 10B:
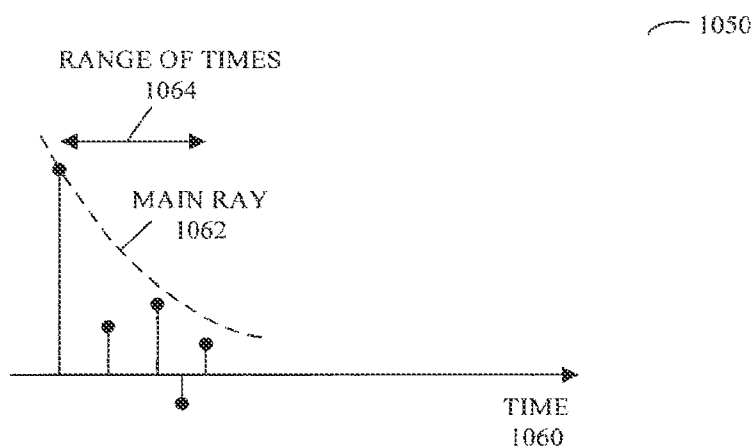
FIG. 10B is a graph illustrating receive signals as a function of time for an embodiment of a communication system.

Moreover, by adjusting the phase value(s) at the transmitter 810 (FIG. 8A) and/or the receiver 860 (FIG. 8B), the delay-spread distortion of the communication channel 116 (FIGS. 1A and 1B) may be reduced. This is shown in FIG. 10B, which presents a graph illustrating samples of the received signals as a function of time 1060 for an embodiment I 050 of a communication system.

In some embodiments, the phase value(s) are adjusted to maximize the received samples associated with the main (e.g., direct) communication path (which is sometimes referred to as main ray 1062) between the transmitter 810 (FIG. 8A) and the receiver 860 (FIG. 8B), as opposed to samples associated with other (weaker or indirect) communication paths (e.g., those associated with multi-path signals). This may be accomplished by focusing on the samples associated with the main or central tap in an equalizer in the receiver 860 (FIG. 8B). Alternatively, the mean height of an eye pattern may be used. Note that variations or noise about the mean height provide a metric that includes the contribution of the one or more multi-path signals to the signals communicated through the communication channel 116 (FIGS. 1A and 1B). Also note that by optimizing these received samples, a range of times I 064 during which the received samples are received may be reduced or minimized, thereby reducing the delay-spread distortion and producing a flatter communication channel.

Figure 11:
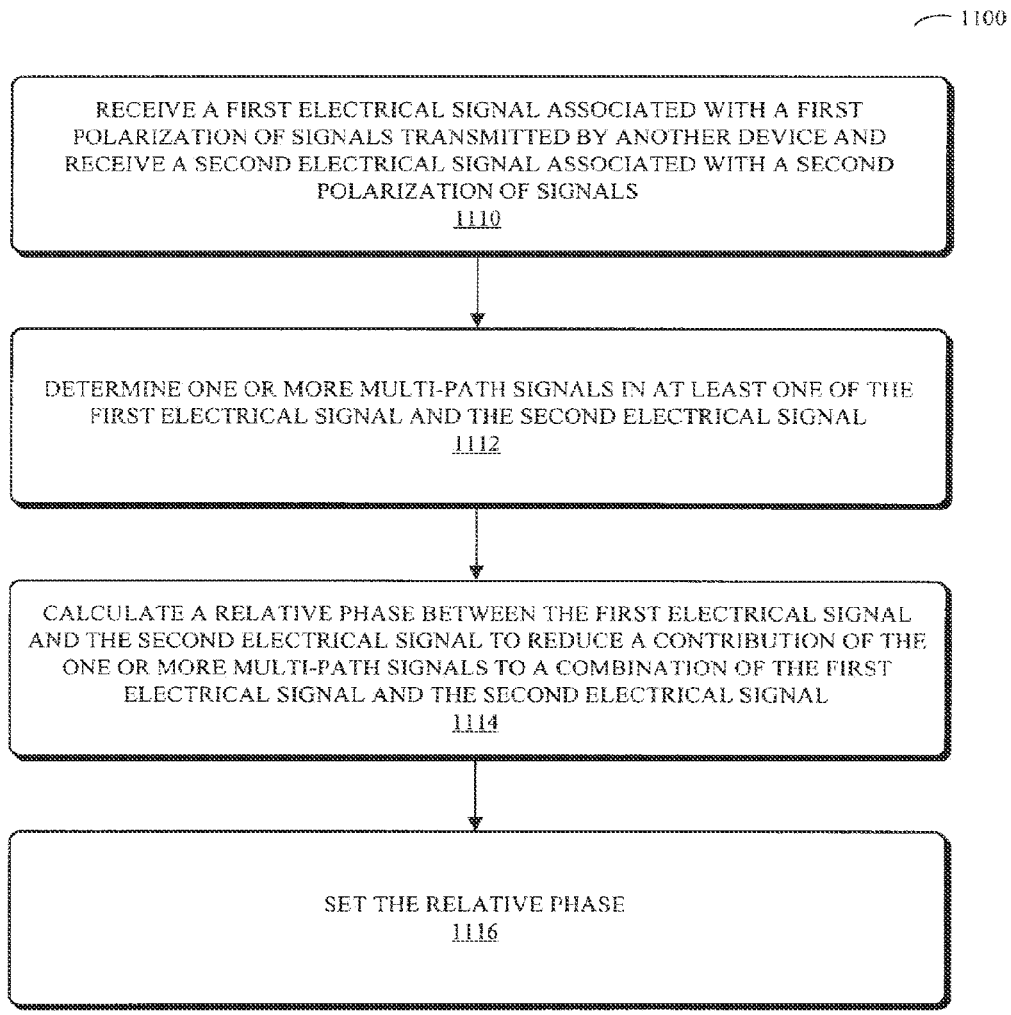
FIG. 11 is a flow chart illustrating an embodiment of a process for setting a relative phase.

We now describe embodiments of a process for communicating data. FIG. 11 presents a flow chart illustrating an embodiment of a process 1100 for setting a relative phase, which may be performed by a device (such as one of the devices 110 in FIGS. 1A and 1B). During operation, the device receives the first electrical signal associated with the first polarization of signals transmitted by another device and receives the second electrical signal associated with the second polarization of the signals (1110). Next, the device determines one or more multi-path signals in the at least one of the first electrical signal and the second electrical signal (1112). Then, the device calculates the relative phase between the first electrical signal and the second electrical signal to reduce a contribution of one or more multi-path signals to a combination of the first electrical signal and the second electrical signal (1114). Moreover, the device sets the relative phase (1116).

Figure 12:
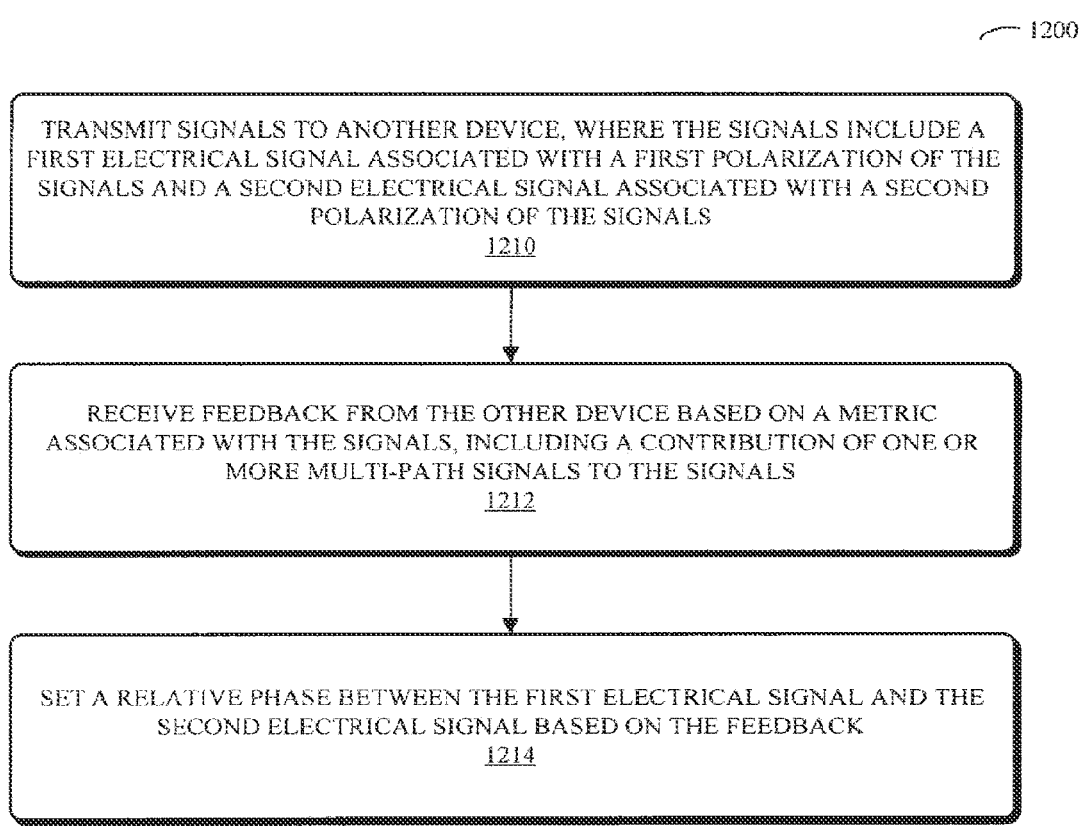
FIG. 12 is a flow chart illustrating an embodiment of a process for setting a relative phase.

FIG. 12 presents a flow chart illustrating an embodiment of a process 1200 for setting a relative phase, which may be performed by the device. During operation, the device transmits signals to another device (1210), where the signals include a first electrical signal associated with a first polarization of the signals and a second electrical signal associated with a second polarization of the signals. Next, the device receives feedback from the other device based on the metric associated with the signals (1212), including a contribution of one or more multi-path signals to the signals. Then, the device sets the relative phase between the first electrical signal and the second electrical signal based on the feedback (1214).

Note that in some embodiments there may be additional or fewer operations in process 1100 (FIG. 11) and/or process 1200. Moreover, the order of the operations may be changed, and two or more operations may be combined into a single operation.

Devices and circuits described herein may be implemented using computer-aided design tools available in the art, and embodied by computer-readable files containing software descriptions of such circuits. These software descriptions may be: at behavioral, register transfer, logic component, transistor and layout geometry-level descriptions. Moreover, the software descriptions may be stored on storage med1A or communicated by carrier waves.

Data formats in which such descriptions may be implemented include, but are not limited to: formats supporting behavioral languages like C, formats supporting register transfer level RTL languages like Verilog and VHDL, formats supporting geometry description languages (such as GDSII, GDSIII, GDSIV, CIF, and MEBES), and other suitable formats and languages. Moreover, data transfers of such files on machine-readable med1A including carrier waves may be done electronically over diverse med1A on the Internet or, for example, via email. Note that physical files may be implemented on machine-readable med1A such as: 4 mm magnetic tape, 8 mm magnetic tape, 3½ inch floppy med1A, CDs, DVDs, and so on.

Figure 13:
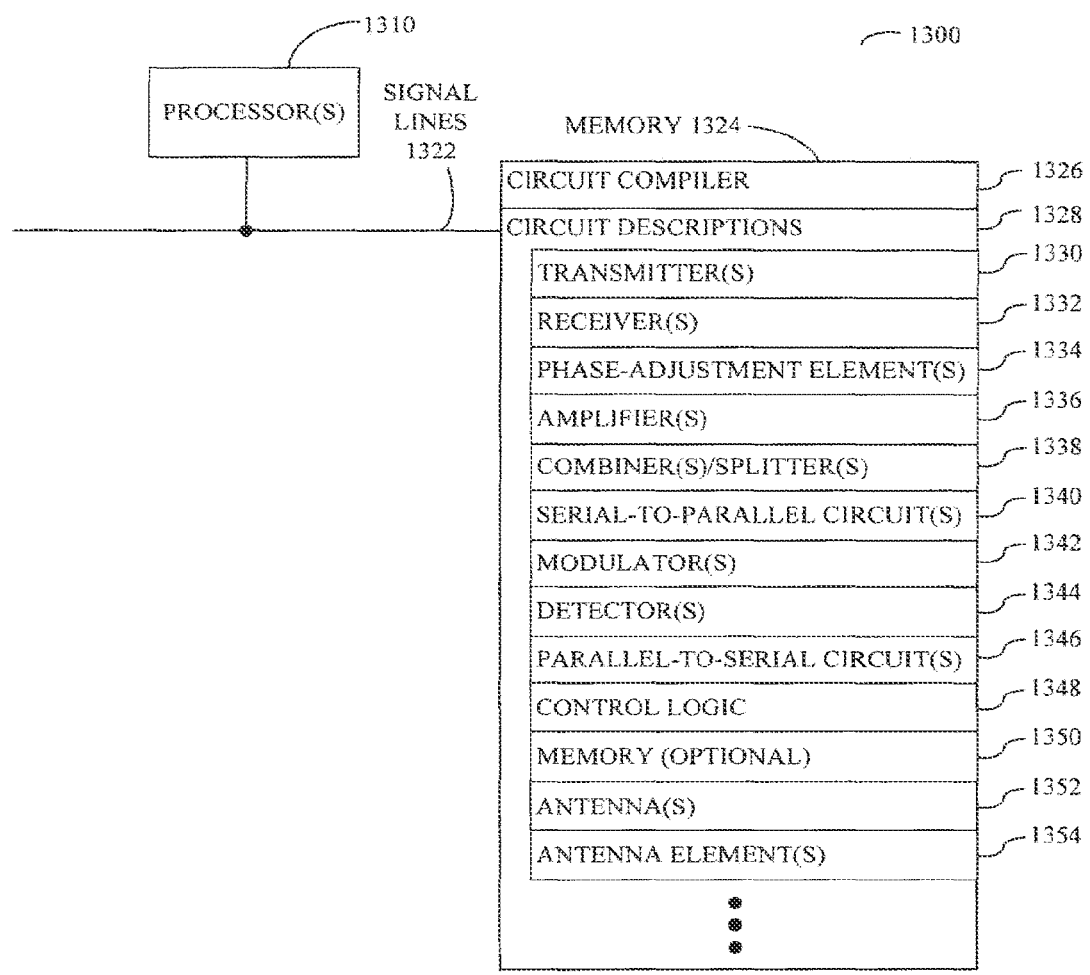
FIG. 13 is a block diagram illustrating an embodiment of a system.

FIG. 13 presents a block diagram illustrating an embodiment of a system 1300 that stores such computer-readable files. This system may include at least one data processor or central processing unit (CPU) 1310, memory 1324 and one or more signal lines or communication busses 1322 for coupling these components to one another. Memory 1324 may include high-speed random access memory and/or non-volatile memory, such as: ROM, RAM, EPROM, EEPROM, Flash, one or more smart cards, one or more magnetic disc storage devices, and/or one or more optical storage devices.

Memory 1324 may store a circuit compiler 1326 and circuit descriptions 1328. Circuit descriptions 1328 may include descriptions of the circuits, or a subset of the circuits discussed above with respect to FIGS. 1-3 and 8. In particular, circuit descriptions 1328 may include circuit descriptions of: one or more transmitters 1330, one or more receivers 1332, one or more phase-adjustment elements 1334, one or more amplifiers 1336, one or more combiners/splitter(s) 1338, one or more ser1A1-to-parallel circuits 1340, one or more modulators 1342, one or more detectors 1344, one or more parallel-to-ser1A1 circuits 1346, control logic 1348 (or a set of instructions), optional memory 1350, one or more antennas 1352, and/or one or more antenna elements 1354.

In some embodiments, system 1300 includes fewer or additional components. Moreover, two or more components can be combined into a single component, and/or a position of one or more components may be changed.

Figure 14:
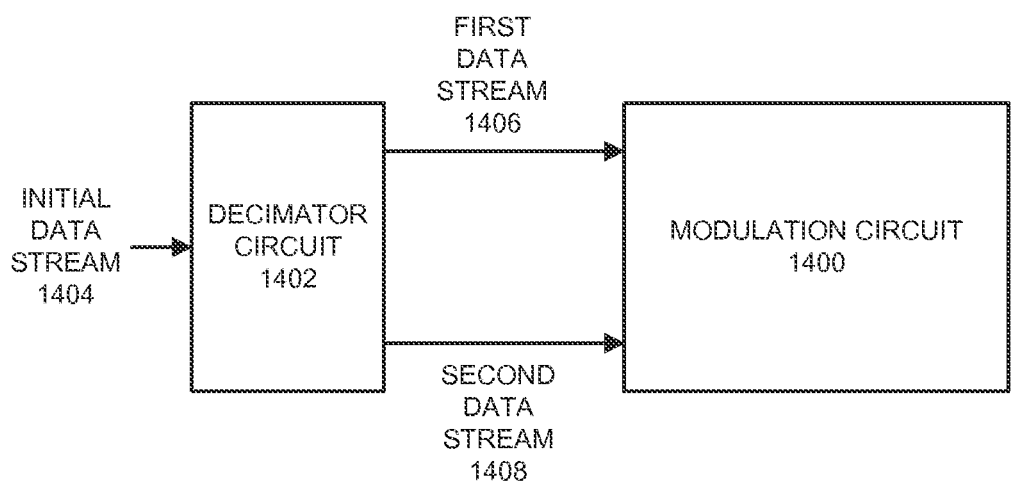
FIG. 14 presents a block diagram illustrating a circuit in accordance with the described embodiments.

FIG. 14 presents a block diagram illustrating a circuit in accordance with the described embodiments. As shown in FIG. 14, some embodiments include a modulation circuit 1400 that is configured to receive a first data stream 1406 and a second data stream 1408. In these embodiments, modulation circuit 1400 produces a first modulated electrical signal by modulating the first data stream 1406 and a second modulated electrical signal by modulating the second data stream 1408. These embodiments can further include a decimator circuit 1402 to receive an initial data stream 1404 and to produce the first data stream 1406 and the second data stream 1408, wherein the first data stream 1406 comprises even data bits from the initial data stream 1404 and the second data stream 1408 comprises odd data bits from the initial data stream 1404.

The foregoing descriptions of embodiments have been presented for purposes of illustration and description only. They are not intended to be exhaustive or to limit the present description to the forms disclosed. Accordingly, many modifications and var1Ations will be apparent to practitioners skilled in the art. Additionally, the above disclosure is not intended to limit the present description. The scope of the present description is defined by the appended claims.

What is claimed is:

1. An integrated circuit, comprising:
a first input node to receive a first electrical signal and a second input node to receive a second electrical signal, wherein the first electrical signal is associated with a first polarization of signals to be received by the integrated circuit and the second electrical signal is associated with a second polarization of the signals to be received by the integrated circuit;
control logic to determine one or more multi-path signals in at least one of the first electrical signal and the second electrical signal and to determine a phase value to reduce a contribution of the one or more multi-path signals to a combination of the first electrical signal and the second electrical signal; and
a phase-adjustment element coupled to at least one of the first input node and the second input node, wherein the phase-adjustment element is to set a relative phase between the first electrical signal and the second electrical signal based on the phase value.

2. The integrated circuit of claim 1, wherein the first polarization and the second polarization are substantially orthogonal.

3. The integrated circuit of claim 1, wherein the signals to be received are elliptically polarized.

4. The integrated circuit of claim 1, further comprising an antenna including a first element and a second element, wherein the first element is coupled to the first input node and the second element is coupled to the second input node, wherein the first element is associated with the first polarization and the second element is associated with the second polarization.

5. The integrated circuit of claim 1, further comprising a first antenna coupled to the first input node and a second antenna coupled to the second input node, wherein the first antenna is associated with the first polarization and the second antenna is associated with the second polarization.

6. The integrated circuit of claim 1, wherein the one or more multi-path signals are associated with a range of times during which the signals are to be received.

7. The integrated circuit of claim 1, wherein the control logic is to determine the phase value to increase a power associated with the first electrical signal or the second electrical signal.

8. The integrated circuit of claim 1, further comprising an amplifier coupled between the phase-adjustment element and the first input node and the second input node.

9. The integrated circuit of claim 1, further comprising:
a combiner coupled to the phase-adjustment element, wherein the combiner is to combine the first electrical signal and the second electrical signal; and
a detection circuit coupled to the combiner.

10. The integrated circuit of claim 1, wherein the phase-adjustment element is to adjust an amplitude of at least one of the first electrical signal and the second electrical signal.

11. The integrated circuit of claim 1, wherein the phase value is between −90° and 90°.

12. The integrated circuit of claim 11, wherein the phase value is quantized using 15° increments.

13. The integrated circuit of claim 1, wherein the integrated circuit is to provide feedback about another phase value to another integrated circuit which transmits the first electrical signal and the second electrical signal to the integrated circuit.

14. The integrated circuit of claim 13, wherein the feedback is provided via a data communication channel between the integrated circuit and the other integrated circuit.

15. The integrated circuit of claim 14, wherein the feedback is provided using in-band or out-of-band communication.

16. The integrated circuit of claim 13, wherein the feedback is provided via a communication channel which is separate from a data communication channel between the integrated circuit and the other integrated circuit.

17. The integrated circuit of claim 1, wherein the phase value is set during a calibration mode.

18. An integrated circuit, comprising:
- a phase-adjustment element to set a relative phase between a first electrical signal and a second electrical signal based on a phase value of the phase-adjustment element; and
- an output interface coupled to the phase-adjustment element, wherein the output interface includes a first input node to receive the first electrical signal and a second input node to receive the second electrical signal,
- wherein the first input node is associated with a first polarization of signals transmitted by the integrated circuit to a receiver device and the second input node is associated with a second polarization of the signals transmitted by the integrated circuit to the receiver device,
- wherein the phase value is based on feedback received from the receiver device that is to receive receiving signals based on the signals transmitted by the integrated circuit, the receiving signals including a direct path component and one or more indirect path components, and
- wherein the feedback is based on relative power of the one or more indirect path components and the direct path component of the receiving signals.

19. A method, comprising:
- receiving a first electrical signal associated with a first polarization of signals transmitted by a transmitter device and receiving a second electrical signal associated with a second polarization of the signals;
- determining one or more multi-path signals in the at least one of the first electrical signal and the second electrical signal;
- calculating a relative phase between the first electrical signal and the second electrical signal to reduce a contribution of the one or more multi-path signals to a combination of the first electrical signal and the second electrical signal; and
- sending a feedback signal indicating the relative phase to the transmitter device.

20. The method of claim 19, wherein the feedback signal sent to the transmitter device is based on a metric associated with at least one of the first electrical signal and the second electrical signal.

21. A method, comprising:
- transmitting first transmitting signals to a device, wherein the first transmitting signals include a first electrical signal associated with a first polarization of the first transmitting signals and a second electrical signal associated with a second polarization of the first transmitting signals;
- receiving feedback from the device based on a metric associated with receiving signals received by the device, the feedback based on a relative power between a direct path component of the receiving signals and one or more indirect path components of the receiving signals; and
- setting a relative phase between the first electrical signal and the second electrical signal based on the feedback; and
- transmitting second transmitting signals to the device, the second transmitting signals including the first electrical signal and the second electrical signal with the relative phase set between the first electrical signal and the second electrical signal.

* * * * *